(12) United States Patent
Chae

(10) Patent No.: US 11,989,271 B2
(45) Date of Patent: May 21, 2024

(54) AUTHENTICATION SYSTEM, AUTHENTICATION METHOD AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 453 days.

(21) Appl. No.: 17/419,295

(22) PCT Filed: Sep. 28, 2020

(86) PCT No.: PCT/JP2020/036614
§ 371 (c)(1),
(2) Date: Jun. 29, 2021

(87) PCT Pub. No.: WO2022/064686
PCT Pub. Date: Mar. 31, 2022

(65) Prior Publication Data
US 2022/0309139 A1 Sep. 29, 2022

(51) Int. Cl.
G06F 21/32 (2013.01)
H04L 9/40 (2022.01)
H04W 12/06 (2021.01)

(52) U.S. Cl.
CPC ...... *G06F 21/32* (2013.01); *G06F 2221/2117* (2013.01); *H04L 63/0861* (2013.01); *H04W 12/06* (2013.01)

(58) Field of Classification Search
CPC ............ G06F 21/32; G06F 2221/2117; H04W 12/06; H04L 63/0861
See application file for complete search history.

(56) References Cited

U.S. PATENT DOCUMENTS 11,436,316 B2 * 9/2022 Chae ................... H04L 63/0861
2013/0159021 A1 * 6/2013 Felsher .................. G16H 10/60
705/3
(Continued)

FOREIGN PATENT DOCUMENTS

CN  111523569 A     8/2020
JP  H08137800 A  *  5/1996
(Continued)

OTHER PUBLICATIONS

Office Action dated Nov. 1, 2022, for corresponding JP Patent Application No. 2022-148996, pp. 1-5.
International Search Report for PCT/JP2020/036614, p. 1-2.

*Primary Examiner* — Harunur Rashid
(74) *Attorney, Agent, or Firm* — HEA LAW PLLC

(57) ABSTRACT

An authentication system includes at least one processor configured to execute authentication based on pieces of first information registered in advance and pieces of second information associated with the first information, select, when a piece of the second information is to be assigned to a user, a plurality of candidates that are some of a plurality of registered pieces of the second information, and assign, as the user's piece of the second information, one of the plurality of candidates that is unassociated with pieces of the first information that are the same as or similar to a user's piece of the first information.

13 Claims, 11 Drawing Sheets

(56) References Cited

U.S. PATENT DOCUMENTS

| | | | |
|---|---|---|---|
| 2013/0159154 A1* | 6/2013 | Purves | G06Q 20/363 705/35 |
| 2015/0220914 A1* | 8/2015 | Purves | G06Q 20/405 705/41 |
| 2020/0074219 A1 | 3/2020 | Zheng et al. | |
| 2020/0167598 A1 | 5/2020 | Zheng et al. | |
| 2020/0250297 A1 | 8/2020 | Chae | |
| 2022/0309139 A1 | 9/2022 | Chae | |

FOREIGN PATENT DOCUMENTS

| | | | | |
|---|---|---|---|---|
| JP | 2000123178 A | * | 4/2000 | G06K 9/00087 |
| JP | 2017-215894 A | | 12/2017 | |
| JP | 2017215894 A | * | 12/2017 | |
| WO | 2020/136763 A1 | | 7/2020 | |
| WO | 2022064686 A1 | | 3/2022 | |

\* cited by examiner

FIG.5

| USER ID | NAME | PASSWORD | FACE PHOTOGRAPH | FACIAL FEATURE AMOUNT | WIRELESS COMMUNICATION ID |
|---|---|---|---|---|---|
| u00001 | TARO YAMADA | ******* | aaa.jpg | (a1,a2,a3,····) | 7534 |
| u00002 | HANAKO SUZUKI | ***** | bbb.jpg | (b1,b2,b3,····) | 3145 |
| u00003 | JIRO KIMURA | ******** | ccc.jpg | (c1,c2,c3,····) | 1751 |
| · | · | · | · | · | · |
| · | · | · | · | · | · |

| WIRELESS COMMUNICATION ID | USER COUNT |
|---|---|
| 3145 | 1 |
| 1751 | 3 |
| 7534 | 4 |
| 6425 | 5 |
| . | . |
| . | . |
| . | . |

DB2

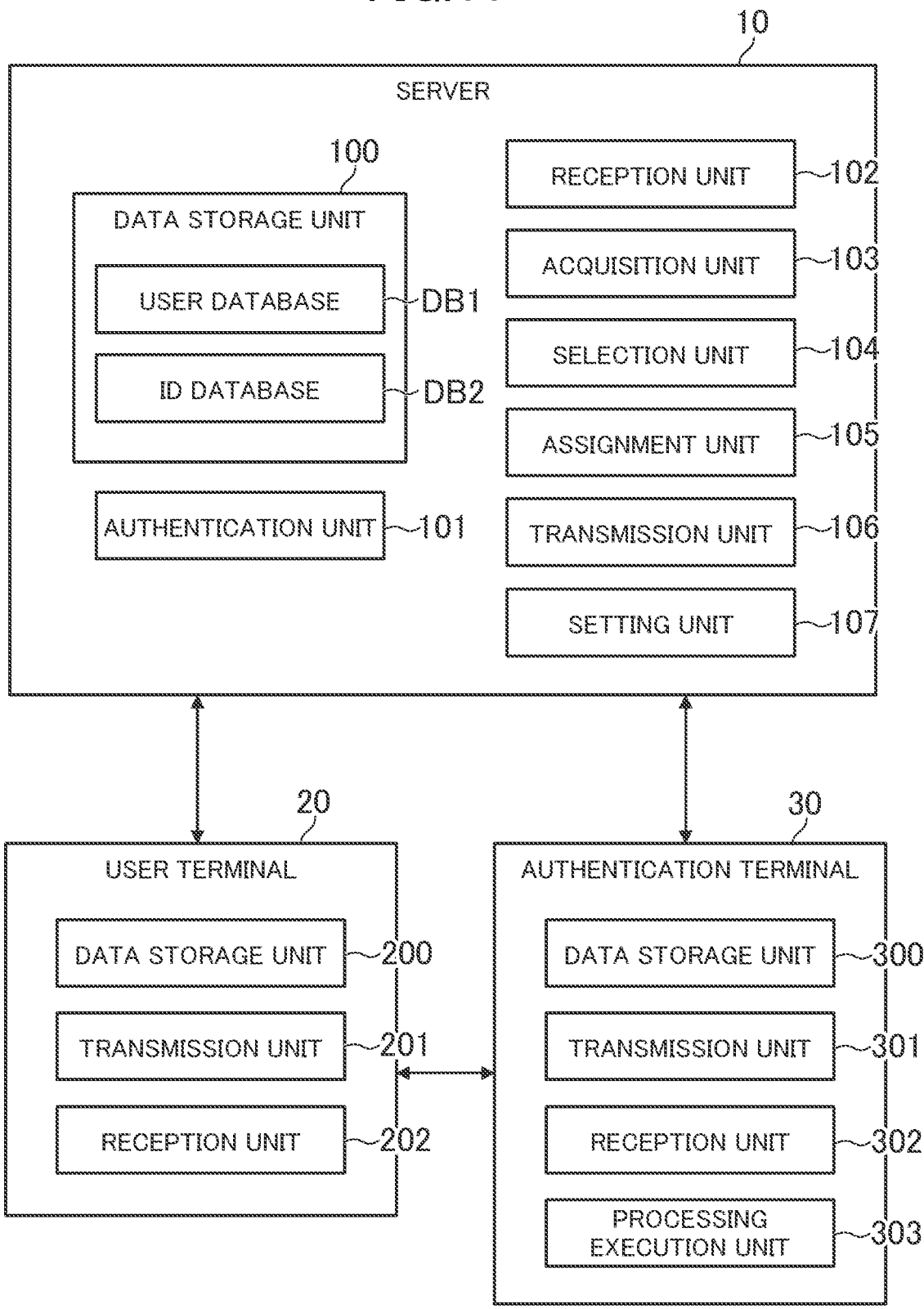

AUTHENTICATION SYSTEM, AUTHENTICATION METHOD AND PROGRAM

CROSS REFERENCE TO RELATED APPLICATIONS

This application is a National Stage of International Application No. PCT/JP2020/036614 filed on Sep. 28, 2020. The contents of the above document are incorporated herein by reference in its entirety.

TECHNICAL FIELD

The present disclosure relates to an authentication system, an authentication method, and a program.

BACKGROUND ART

Hitherto, there has been known a technology with which authentication is executed based on first information registered in advance and second information associated with the first information. In Patent Literature 1, there is described an information processing device configured to register, in a database, for each user, a pair of a piece of biometric information, which is an example of the first information, and a group, which is an example of the second information. The authentication in Patent Literature 1 is executed based on the pair of the piece of biometric information and the group which is registered in the database.

When the same group is assigned to each of a plurality of users similar to one another in biometric information, the technology of Patent Literature 1 may have trouble with distinguishing one user from another user among the plurality of users. The information processing device therefore calculates, when registering a user's group, for every registered group, a degree of similarity between the user's biometric information and the group's biometric information to search for a group in which every piece of biometric information has a degree of similarity lower than a threshold value. In Patent Literature 1, there is also included description that the information processing device selects one group at a time and keeps calculating the degree of similarity until a group in which every piece of biometric information is lower than the threshold value is found.

CITATION LIST

Patent Literature

[PTL 1] JP 2017-215894 A

SUMMARY OF INVENTION

Technical Problem

The technology of Patent Literature 1, however, requires calculation of the degree of similarity of every piece of biometric information for every group, and consequently applies a heavy processing load on the information processing device. Even with the information processing device selecting one group at a time, the processing load on the information processing device is still heavy because the search of biometric information requires numerous repeating of transmission of a query to the database until a group in which every piece of biometric information has a degree of similarity lower than the threshold value is found.

An object of the present disclosure is to lighten a processing load.

Solution to Problem

According to one aspect of the present disclosure, there is provided an authentication system including: authentication means for executing authentication based on pieces of first information registered in advance and pieces of second information associated with the pieces of first information; selection means for selecting, when a piece of the second information is to be assigned to a user, a plurality of candidates that are some of a plurality of registered pieces of the second information; and assignment means for assigning, as the user's piece of the second information, one of the plurality of candidates that is unassociated with pieces of the first information that are the same as or similar to a user's piece of the first information.

According to one aspect of the present disclosure, there is provided an authentication method including the steps of: executing authentication based on pieces of first information registered in advance and pieces of second information associated with the pieces of first information; selecting, when a piece of the second information is to be assigned to a user, a plurality of candidates that are some of a plurality of registered pieces of the second information; and assigning, as the user's piece of the second information, one of the plurality of candidates that is unassociated with pieces of the first information that are the same as or similar to a user's piece of the first information.

According to one aspect of the present disclosure, there is provided a program for causing a computer to function as: selection means for selecting, in authentication executed based on pieces of first information registered in advance and pieces of second information associated with the pieces of first information, when a piece of the second information is to be assigned to a user, a plurality of candidates that are some of a plurality of registered pieces of the second information; and assignment means for assigning, as the user's piece of the second information, one of the plurality of candidates that is unassociated with pieces of the first information that are the same as or similar to a user's piece of the first information.

According to one aspect of the present disclosure, the authentication is executed based on similarity between pieces of the first information, and the assignment means is configured to assign, when the plurality of candidates include a plurality of candidates that are unassociated with pieces of the first information that are similar to the user's piece of the first information, one of the plurality of candidates as the user's piece of the second information, based on each piece of the first information that is associated with one of the plurality of candidates, and on the user's piece of the first information.

According to one aspect of the present disclosure, the assignment means is configured to: identify, for each of the plurality of candidates that are unassociated with pieces of the first information that are similar to the user's piece of the first information, a piece of the first information most similar to the user's piece of the first information, out of pieces of the first information that are associated with the candidate; and acquire, as the user's piece of the second information, one of the plurality of candidates that is associated with the identified piece of the first information that is least similar to the user's piece of the first information, out of the identified piece of the first information of every one of the plurality of candidates.

According to one aspect of the present disclosure, the authentication system further includes acquisition means for acquiring, for each of the plurality of registered pieces of the second information, a count indicating how many pieces of the first information are associated with the registered piece of the second information, and the selection means is configured to select the plurality of candidates by selecting a plurality of pieces of the second information out of the plurality of registered pieces of the second information, in ascending order of the acquired count.

According to one aspect of the present disclosure, the selection means is configured to select, at random, a plurality of candidates that are some of the plurality of candidates selected in ascending order of the acquired count, the assignment means is configured to determine whether a piece of the first information that is the same as or similar to the user's piece of the first information is associated with the plurality of randomly selected candidates, and the random selection by the selection means and the determination by the assignment means are repeated until the one of the plurality of candidates that is unassociated with a piece of the first information that is the same as or similar to the user's piece of the first information is found.

According to one aspect of the present disclosure, the selection means is configured to select, when the plurality of candidates selected in ascending order of the acquired count include no candidate that is unassociated with a piece of the first information that is the same as or similar to the user's piece of the first information, at least one next candidate by selecting at least one next piece of the second information in ascending order of the acquired count.

According to one aspect of the present disclosure, the selection means is configured to select the candidates at random until a total count indicating a sum of the acquired count acquired for every one of the plurality of registered pieces of the second information reaches a predetermined count.

According to one aspect of the present disclosure, the selection means is configured to select the plurality of candidates by selecting a plurality of pieces of the second information in ascending order of the acquired count, until the total count reaches a predetermined count.

According to one aspect of the present disclosure, the assignment means is configured to assign a piece of the second information to the user based on a result of a search of a database, the database storing the first information and the second information for each of a plurality of other users, the search using one query including the plurality of candidates.

According to one aspect of the present disclosure, the authentication system further includes reception means for receiving an assignment request for requesting assignment of a new piece of the second information, from a user terminal of the user, each time a predetermined application recorded in the user terminal is activated, the selection means is configured to select the plurality of candidates when the assignment request is received, and the assignment means is configured to assign a new piece of the second information to the user from the plurality of candidates.

According to one aspect of the present disclosure, the authentication system further includes: setting means for setting an expiration date to a piece of the second information that is recorded in the user terminal; and transmission means for transmitting an activation request for requesting activation of the predetermined application to the user when the expiration date passes or expiration of the expiration date approaches.

According to one aspect of the present disclosure, the piece of the second information that is assigned to the user is recorded in the user terminal of the user, and the authentication means is configured to execute the authentication based on the user's piece of the first information that is acquired with use of an authentication terminal configured to perform wireless communication to and from the user terminal, a piece of the second information that is transmitted from the user terminal to the authentication terminal through wireless communication, the user's piece of the first information that is registered in advance, and a piece of the second information that is associated with the user's registered piece of the first information.

According to one aspect of the present disclosure, the user terminal is configured to transmit the piece of the second information to the authentication terminal by using an advertising packet in a predetermined wireless communication standard, and the authentication means is configured to execute the authentication based on the piece of the second information transmitted by using the advertising packet.

According to one aspect of the present disclosure, the first information is biometric information, the second information is identification information to be associated with the biometric information, and the authentication means is configured to execute the authentication based on a piece of the biometric information that is registered in advance and a piece of the identification information that is associated with the registered piece of the biometric information.

Advantageous Effects of Invention

According to the present disclosure, it is possible to lighten a processing load.

BRIEF DESCRIPTION OF DRAWINGS

FIG. 5 is a table for showing a data storage example of a user database.

FIG. 6 is a table for showing a data storage example of an ID database.

FIG. 11 is a function block diagram of Modification Example (3) of the present disclosure.

DESCRIPTION OF EMBODIMENTS

[1. Overall Configuration of Authentication System]

Figure 1:
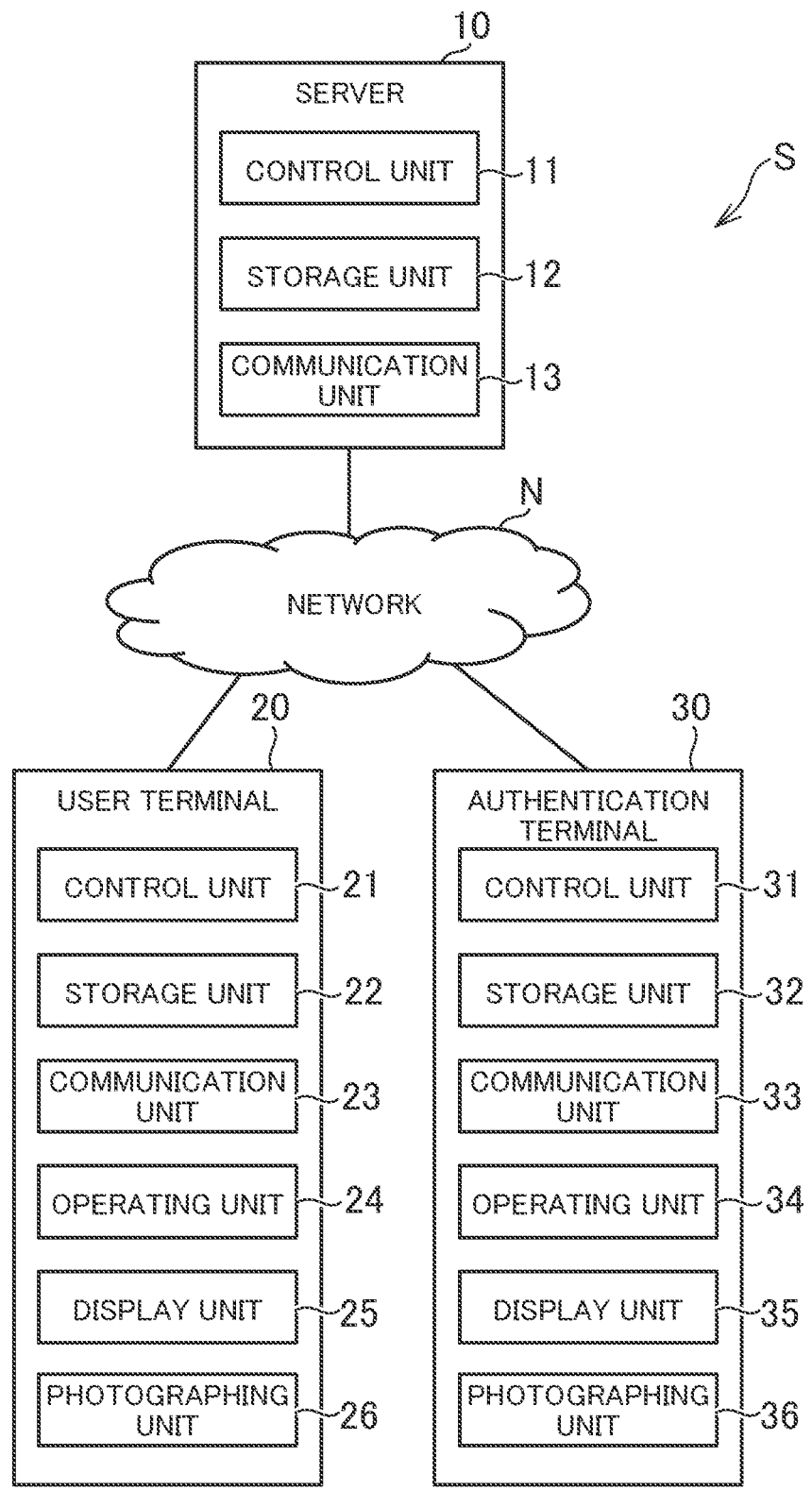
FIG. 1 is a diagram for illustrating an example of an overall configuration of an authentication system.

Description is now given of an example of an embodiment of an authentication system according to the present disclosure. FIG. 1 is a diagram for illustrating an example of an overall configuration of the authentication system. As illustrated in FIG. 1, an authentication system S includes a server 10, a user terminal 20, and an authentication terminal 30. Those parts can be connected to a network N, for example, the Internet. In FIG. 1, one server 10, one user terminal 20, and one authentication terminal 30 are illustrated, but there may be a plurality of servers 10, user terminals 20, and authentication terminals 30.

The server 10 is a server computer. The server 10 includes a control unit 11, a storage unit 12, and a communication unit 13. The control unit 11 includes at least one microprocessor. The control unit 11 executes processing as programmed by programs and data stored in the storage unit 12. The storage unit 12 includes a main memory unit and an auxiliary memory unit. For example, the main memory unit is a volatile memory, for example, a RAM. Further, for example, the auxiliary memory unit is a non-volatile memory such as a ROM, an EEPROM, a flash memory, or a hard disk drive. The communication unit 13 is a communication interface for wired communication or wireless communication.

The user terminal 20 is a computer to be operated by a user. For example, the user terminal 20 is a mobile phone (including a smart phone), a personal digital assistant (including a tablet-type computer and a wearable device), a personal computer, or the like. In this embodiment, the user terminal 20 includes a control unit 21, a storage unit 22, a communication unit 23, an operation unit 24, a display unit 25, and a photographing unit 26. Physical components of the control unit 21, the storage unit 22, and the communication unit 23 may be similar to those of the control unit 11, the storage unit 12, and the communication unit 13, respectively. The operation unit 24 is an input device. For example, the operation unit 24 includes a touch panel, a mouse, a keyboard, or buttons. For example, the display unit 25 is a liquid crystal display or an organic EL display. The photographing unit 26 includes at least one camera. For example, the photographing unit 26 includes an image pickup element such as a CCD image sensor or a CMOS image sensor. The photographing unit 26 is configured to record, as digital data, an image taken by the imaging element. The image may be a still image or a moving image taken at a predetermined frame rate.

The authentication terminal 30 is a computer to be used for authentication. For example, the authentication terminal 30 is a mobile phone, a personal digital assistant, a personal computer, or the like. In this embodiment, the authentication terminal 30 includes a control unit 31, a storage unit 32, a communication unit 33, an operation unit 34, a display unit 35, and a photographing unit 36. Physical components of the control unit 31, the storage unit 32, the communication unit 33, the operation unit 34, the display unit 35, and the photographing unit 36 may be similar to those of the control unit 11, the storage unit 12, the communication unit 13, the operation unit 24, the display unit 25, and the photographing unit 26, respectively.

Programs and data described as being stored into the storage units 12, 22, and 32 may be supplied thereto via the network N. Further, the respective hardware configurations of the server 10, the user terminal 20, and the authentication terminal 30 are not limited to the above-mentioned examples, and various types of hardware can be applied thereto. For example, the hardware configuration may include at least one of a reading unit (e.g., an optical disc drive or a memory card slot) configured to read a computer-readable information storage medium, and an input/output unit (e.g., a USB port) configured to input and output data to/from an external device. For instance, at least one of the program and the data that are stored on the information storage medium may be supplied via at least one of the reading unit and the input/output unit.

[2. Outline of Authentication System]

The authentication system S executes authentication in order to check authenticity of a user at any scene. This embodiment takes biometric authentication as an example, but the authentication system S can execute various types of authentication. For example, the authentication system S may execute two-dimensional code authentication, passcode authentication, password authentication, electronic stamp authentication, personal identification number authentication, or countersign authentication. To give another example, the authentication system S may execute multi-stage authentication by combining a plurality of types of authentication.

Biometric authentication is an authentication method utilizing physical features or behavioral features of humans. Examples of biometric authentication utilizing physical features include face authentication, fingerprint authentication, DNA authentication, palm authentication, retina authentication, iris authentication, vein authentication, and voice authentication. Examples of biometric information utilizing behavioral features include handwriting authentication, keystroke authentication, lip movement authentication, blink authentication, and gait authentication.

In this embodiment, description is given on processing of the authentication system S taking, as an example, a scene in which a user attempts to pass a security gate. Face authentication is described as an example of biometric authentication. The authentication system S is applicable to various scenes as in modification examples described later. Scenes to which the authentication system S is applied are not limited to the example of this embodiment.

Figure 2:
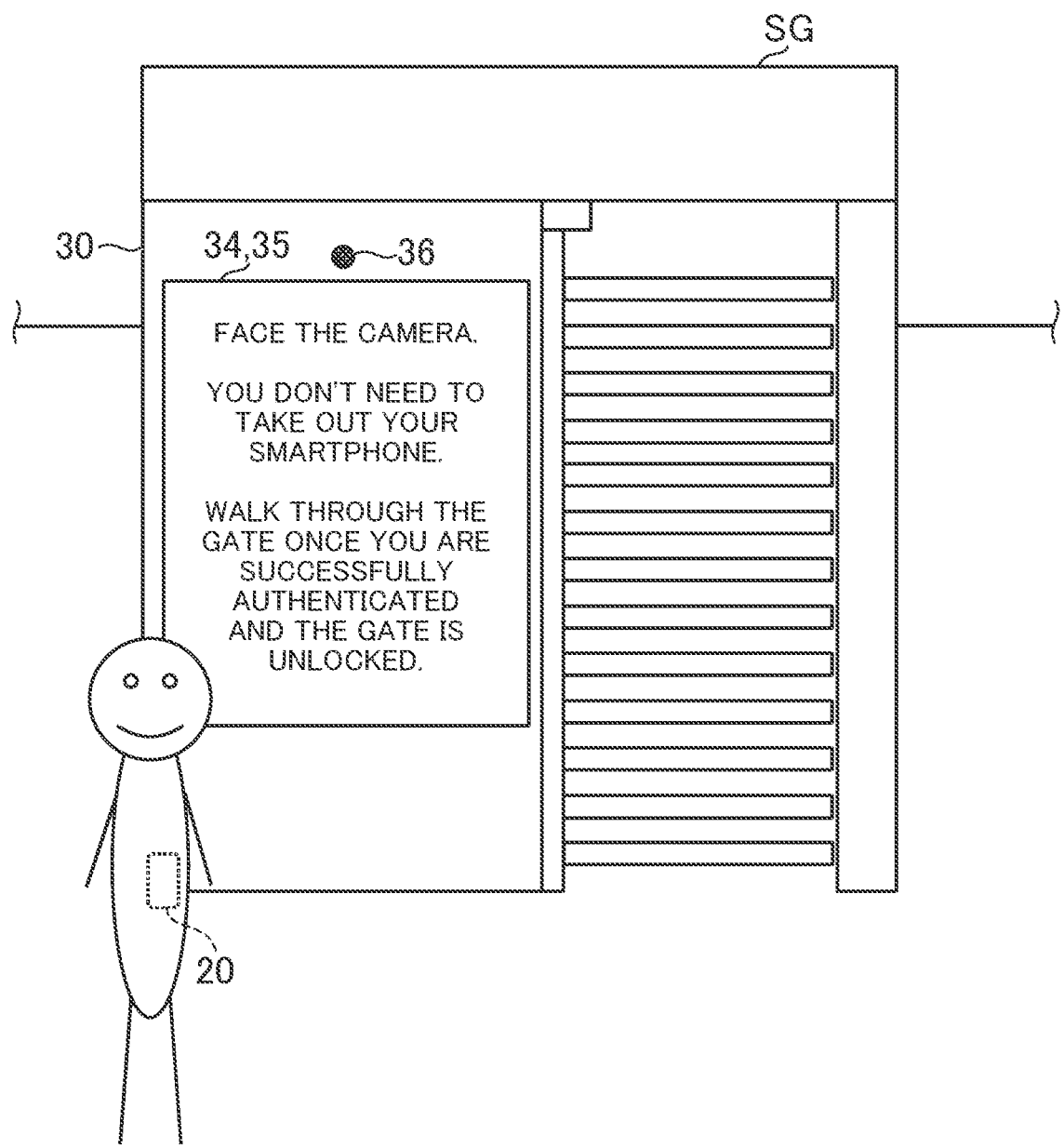
FIG. 2 is a diagram for illustrating an example of scenes in which the authentication system is used.

FIG. 2 is a diagram for illustrating an example of scenes in which the authentication system S is used. As illustrated in FIG. 2, the authentication terminal 30 is connected to a security gate SG. A door of the security gate SG is locked by a locking mechanism. When the user is successfully authenticated, the door is unlocked. The security gate SG is placed in any facility, for example, a company at which the user works or a public facility. Only persons authorized to enter the facility can pass the security gate SG.

In order to use an authentication service provided by the authentication system S, the user operates the user terminal 20 to perform predetermined operation of user registration. When the user completes the user registration, a user ID by which the user is uniquely identified is issued. A name and other pieces of information input by the user are registered in the server 10. At the time of user registration or any point in time subsequent to the user registration, the user uploads his or her face photograph to the server 10.

The face photograph may be stored in the storage unit in advance, or may be a face photograph photographed by the photographing unit 26 on the spot and uploaded. The user may upload a plurality of face photographs. The server 10 calculates a facial feature amount of the user based on the uploaded face photograph. The facial feature amount is registered in the server 10 to be used in authentication.

In this embodiment, an ID assigned to the user is also used in authentication in addition to the facial feature amount. This ID is transmitted from the user terminal 20 to the authentication terminal 30 with the use of wireless communication when the user approaches the security gate SG. This ID may be the user ID but, in this embodiment, is information different from the user ID. This ID is hereinafter referred to as "wireless communication ID." The wireless communication ID may semi-permanently be kept the same without being updated. The wireless communication ID in this embodiment is updated each time an application installed in the user terminal 20 is activated. The wireless communication ID in this embodiment can also be duplicated among users whereas duplication of a user ID among users is prohibited. When the uploading of a face photograph and the assigning of the wireless communication ID are completed, the user is ready to pass the security gate SG.

Figure 3:
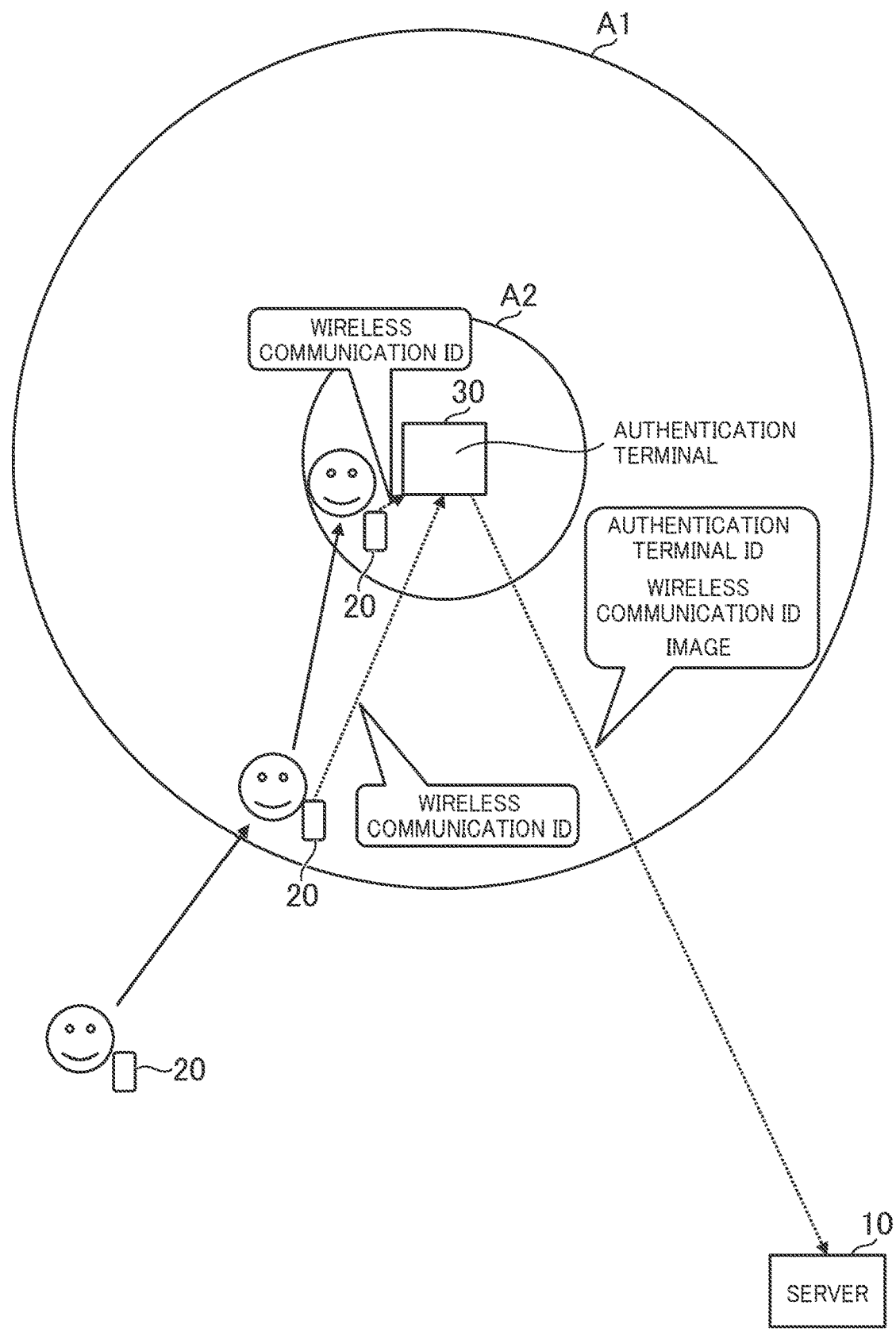
FIG. 3 is a diagram for illustrating an example of a flow of authentication in the authentication system.

FIG. 3 is a diagram for illustrating an example of a flow of authentication in the authentication system S. As illustrated in FIG. 3, an effective communication area A1 and an effective authentication area A2 are set around the authentication terminal 30. The effective communication area A1 and the effective authentication area A2, which are each circular in FIG. 3, may have any shape and size, for example, a semi-circle, an ellipse, or a polygon.

The effective communication area A1 is an area indicating a communication range of the communication unit 33 of the authentication terminal 30. The effective communication area A1 varies depending on a communication standard to be used and a communication environment. In this embodiment, a case in which Bluetooth Low Energy (BLE) is used is described, but any other communication standard is usable. For example, Wi-Fi (trademark) or a Bluetooth (trademark) standard other than BLE may be used.

The effective communication area A1 is, for example, from approximately 3 meters to approximately 5 meters in radius. When the user terminal 20 enters the effective communication area A1, the user terminal 20 can hold direct communication to and from the authentication terminal 30. Pairing between the user terminal 20 and the authentication terminal 30 may be executed, but is not executed in this embodiment.

The effective authentication area A2 is an area in which the execution of authentication is permitted. The effective authentication area A2 is smaller than the effective communication area A1. In other words, the effective authentication area A2 is included in the effective communication area A1, and an edge portion of the effective authentication area A2 is closer to the authentication terminal 30 than an edge portion of the effective communication area A1 is. For example, the effective authentication area A2 is from approximately 1 meter to approximately 2 meters in radius. When the user enters the effective communication area A1, communication between the user terminal 20 and the authentication terminal 30 becomes possible, but authentication is not executed until the user enters the effective authentication area A2.

An example in which the user approaches the authentication terminal 30 with the user terminal 20 kept in a pocket or a bag is discussed. When the user enters the effective communication area A1, direct communication between the user terminal 20 and the authentication terminal 30 becomes possible. In this embodiment, the user terminal 20 uses an advertising packet to transmit the wireless communication ID stored in the storage unit 22 to the authentication terminal 30. The user ID is not transmitted to the authentication terminal 30 even when the user ID is stored in the storage unit 22.

The authentication terminal 30 records the wireless communication ID received from the user terminal 20 in the storage unit 32. In this embodiment, the authentication terminal 30 calculates a distance to the user terminal 20 by scanning an intensity (received signal strength indication: RSSI) of a wireless communication signal in order to identify the user's location. The authentication terminal 30 can identify from this distance whether the user is located in the effective communication area A1 or the effective authentication area A2. The authentication terminal 30 filters only the wireless communication ID received from the user terminal 20 that is within a predetermined distance.

When the user comes closer to the authentication terminal 30 and enters the effective authentication area A2, the execution of authentication is permitted. The authentication terminal 30 uses the photographing unit 36 to photograph the user's face. The authentication terminal 30 transmits, to the server 10, its own authentication terminal ID, the wireless communication ID received from the user terminal 20 that is within the effective authentication area A2, and an image photographed by the photographing unit 36. The server 10 receives the authentication terminal ID, the wireless communication ID, and the image from the authentication terminal 30, and calculates a feature amount of the face photographed in the image. The server 10 acquires, from pieces of information indicating a facial feature amount registered in advance, a facial feature amount that is associated with the wireless communication ID received from the authentication terminal 30. The server 10 executes authentication by determining whether the acquired facial feature amount and the calculated facial feature amount are similar to each other.

When authentication is a success, the server 10 transmits a notification indicating the success of the authentication to the authentication terminal 30, and the security gate SG is unlocked. Authentication in this embodiment is thus executed based on a facial feature amount and a wireless communication ID that are registered in the server 10, a wireless communication ID recorded in the user terminal 20, and an image photographed by the authentication terminal 30.

As described above, duplication of a wireless communication ID among users is allowed, and it is therefore a possibility that users resembling one another in facial features may not be distinguished from one another when a wireless communication ID is duplicated among the users. The server 10 is accordingly required to prevent duplication of a wireless communication ID among users resembling one another in facial features. With the method of the related art, however, a heavy processing load may be applied to the server 10 as described in the description of the related art.

The server 10 addresses this by selecting, as candidates for a wireless communication ID to be assigned to one user, only some of, not all of, wireless communication IDs that are being used by other users. In addition, the server 10 selects a plurality of candidates at once, instead of one candidate at a time, to determine whether there is a candidate that is not being used by another user resembling the current user in facial features. The processing load on the server 10 is lightened in this manner. The following is description on details of this technology.

[3. Functions Implemented in Authentication System]

Figure 4:
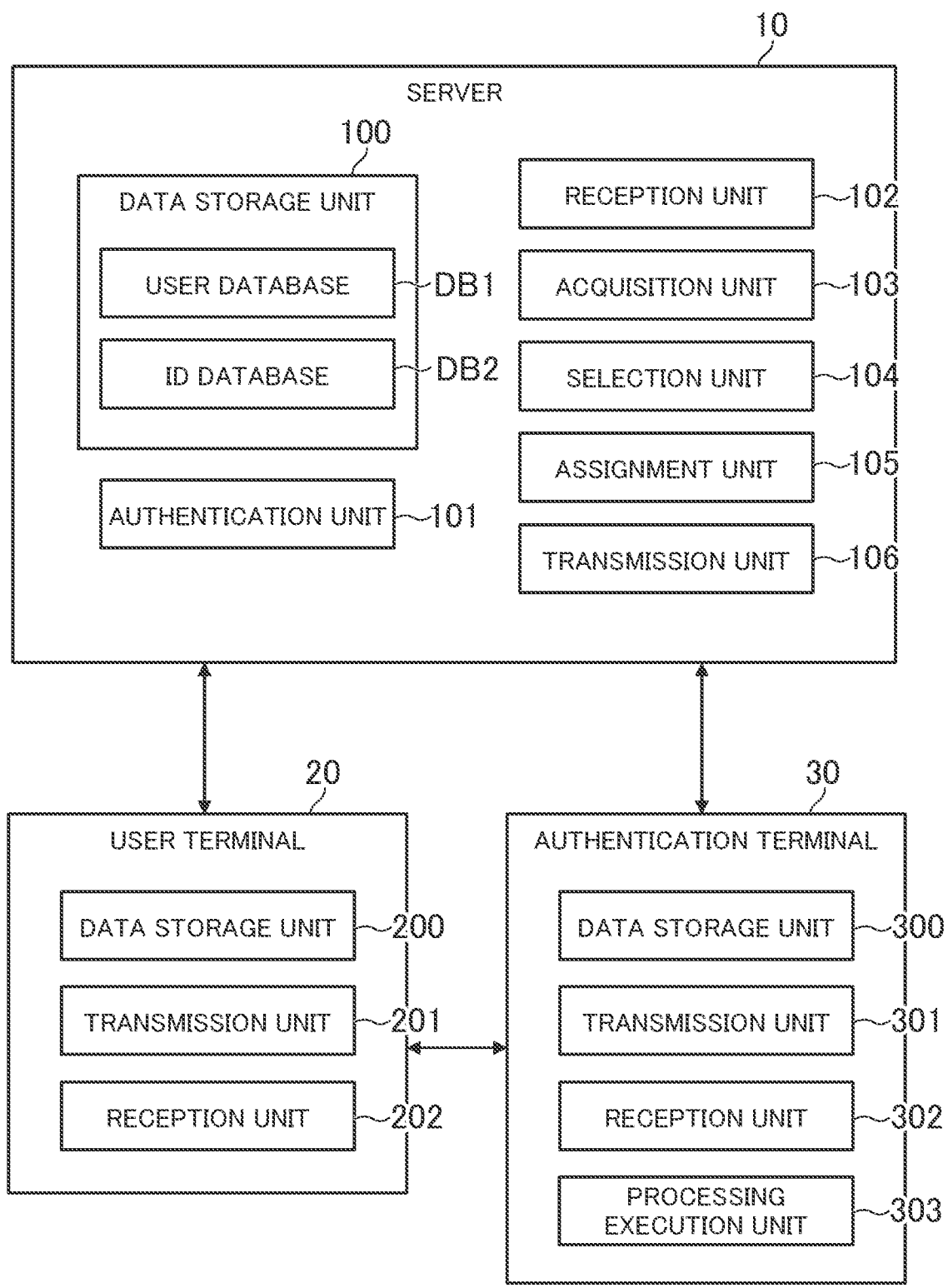
FIG. 4 is a function block diagram for illustrating an example of functions implemented in the authentication system.

FIG. 4 is a function block diagram for illustrating an example of the functions implemented in the authentication system S. Here, functions implemented in the server 10, the user terminal 20, and the authentication terminal 30 are described.

[3-1. Functions Implemented in Server]

As illustrated in FIG. 4, a data storage unit 100, an authentication unit 101, a reception unit 102, an acquisition unit 103, a selection unit 104, an assignment unit 105, and a transmission unit 106 are implemented in the server 10.

[Data Storage Unit]

The data storage unit 100 is mainly implemented by the storage unit 12. The data storage unit 100 is configured to store the data required for authentication. Here, as an example of the data stored in the data storage unit 100, there are described a user database DB1 and an ID database DB2.

FIG. 5 is a table for showing a data storage example of the user database DB1. As shown in FIG. 5, the user database DB1 is a database in which various types of information on each of a plurality of users are stored. For example, a user ID, a name of a user, a password, data of an uploaded face photograph, a facial feature amount calculated from the face photograph, and a wireless communication ID are stored in the user database DB1.

In this embodiment, the password is not used in authentication using the authentication terminal 30, but is used for other purposes including modification of information that is registered in the user database DB1. The user can modify information about himself or herself when logging in to the server 10 by inputting the user ID and the password to the user terminal 20.

The facial feature amount is information created by quantifying a facial feature. For example, the facial feature amount indicates a relative position, size, shape, or other features of a facial part. The facial feature amount may be calculated at the time of authentication on the spot, with only a face photograph registered in the user database DB1 in advance. When a plurality of face photographs are registered, the facial feature amount is calculated for each of the plurality of face photographs.

Various methods are applicable to the face authentication itself. As the face authentication, for example, principal component analysis, linear discriminant analysis, elastic matching, a hidden Markov model, or other methods are applicable. The feature amount may be calculated with a formula corresponding to one of those methods. In this embodiment, a case in which the facial feature amount is expressed by a multidimensional vector is described, but the facial feature amount may be expressed in other forms such as an array or a single numerical value.

The wireless communication ID stored in the user database DB1 is a wireless communication ID assigned to the user. In other words, the wireless communication ID being used by the user is stored in the user database DB1. This wireless communication ID is the same as a wireless communication ID that is stored in the data storage unit 200 described later. Although a case of expressing the wireless communication ID by a four-digit numerical value is described in the example of FIG. 5, the wireless communication ID can be expressed in any format. For instance, the wireless communication ID may be expressed by a single-digit numerical value, a two-digit numerical value, a three-digit numerical value, a five or higher-digit numerical value, characters, a combination of characters and numerical values, or a vector.

When a user executes user registration, for example, a new record is created in the user database DB1. A name, data of a face photograph, and a facial feature amount calculated from the face photograph are stored in the new record in association with a user ID. A wireless communication ID assigned at the time of user registration or uploading of the face photograph are stored in this record as well. In this embodiment, the wireless communication ID stored in the user database DB1 is updated each time the application of the user terminal 20 is activated.

FIG. 6 is a table for showing a data storage example of the ID database DB2. As shown in FIG. 6, the ID database DB2 is a database for managing each of a plurality of wireless communication IDs. For example, for each of the plurality of wireless communication IDs, a user count indicating the number of users who uses the wireless communication ID is stored in the ID database DB2.

The user count of a wireless communication ID used by at least one user is stored in the ID database DB2. The user count of a wireless communication ID used by no one (that is, 0 users) may be stored in the ID database DB2. The user count of a wireless communication ID can also be expressed as the number of pieces of information indicating a facial feature amount that are associated with the wireless communication ID, or the number of records that hold the wireless communication ID in the user database DB1, or the number of user terminals 20 each having the wireless communication ID recorded therein.

When, for example, a new wireless communication ID is issued or a wireless communication ID assigned to a user is updated, the contents of the ID database DB2 are updated as well. When a wireless communication ID is assigned to a user, the user count of the wireless communication ID increases. When the wireless communication ID of a user is updated and is no longer assigned to the user, the user count of the wireless communication ID decreases. The server 10 counts the number of records for each wireless communication ID stored in the user database DB1, to thereby acquire the user count of the wireless communication ID and update the ID database DB2.

[Authentication Unit]

The authentication unit 101 is implemented mainly by the control unit 11. The authentication unit 101 is configured to execute authentication based on a facial feature amount registered in advance and a wireless communication ID associated with the facial feature amount. "Registering" means recording of data in the data storage unit 100. In this embodiment, a facial feature amount and a wireless communication ID are registered in the user database DB1 in association with each other. "Associated" means a state in which one piece of information can be traced to another piece of information. Storage of a plurality of pieces of information in the same record of a database corresponds to the plurality of pieces of information being associated with one another.

In this embodiment, the facial feature amount is an example of first information, and the wireless communication ID is an example of second information. The facial feature amount is also an example of biometric information, and the wireless communication ID is an example of identification information to be associated with the biometric information. Accordingly, in the description of this embodiment, "facial feature amount" can be read as the first information or the biometric information, and "wireless communication ID" can be read as the second information or the identification information. The authentication system S may be configured so that, instead of a facial feature amount calculated from a face photograph uploaded by the user, the face photograph itself corresponds to the first information or the biometric information.

The first information and the second information are each authentication information. The authentication information is information used in authentication. The first information and the second information may each be expressed as information that serves as a correct answer or an index in authentication. It is sufficient for each of the first information and the second information to be information suited to an authentication method to be used. For example, the first information may be biometric information other than the facial feature amount, a user ID, a password, a passcode, a two-dimensional code, a multi-touch pattern of an electronic stamp, a countersign, a birthdate and year, a phone number, or an e-mail address. The second information is only required to be authentication information of a type different from the first information, and may be a type of authentication information that is one of the pieces of authentication information given above as an example and that is not the first information.

In this embodiment, a wireless communication ID assigned to a user is recorded in the user terminal 20 of the user. As described with reference to FIG. 3, the authentication unit 101 executes authentication based on the user's facial feature amount acquired with the use of the authentication terminal 30, which can hold wireless communication to and from the user terminal 20, the wireless communication ID transmitted from the user terminal 20 to the authentication terminal 30 via wireless communication, the user's facial feature amount registered in advance, and a wireless communication ID associated with the registered facial feature amount.

The user's facial feature amount acquired with the use of the authentication terminal 30 is a facial feature amount to serve as a query in authentication. It is sufficient for this facial feature amount to be acquired by using the authentication terminal 30 in some way. In this embodiment, a case of executing calculation of the facial feature amount on the server 10 is described, but the calculation may be executed on the authentication terminal 30. When authentication information that is not the facial feature amount is to be used as the first information, and it is required to have the user input the first information, the first information may be acquired by using the operating unit 34 of the authentication terminal 30.

In another example in which authentication uses a two-dimensional code including the first information, the first information may be acquired by using the photographing unit 36 of the authentication terminal 30 or a code reader. In still another example in which the first information is recorded in the user terminal 20 to be transmitted, in addition to the second information, with the use of wireless communication, the first information may be acquired with the use of the communication unit 33 of the authentication terminal 30. In this embodiment, it is sufficient to use some piece of hardware of the authentication terminal 30 in acquisition of the first information. The same applies to the second information.

In this embodiment, the user terminal 20 uses an advertising packet in a predetermined wireless communication standard to transmit the wireless communication ID to the authentication terminal 30. An advertising packet having a format regulated by a known communication standard can be used. The authentication unit 101 executes authentication based on the wireless communication ID transmitted with the use of the advertising packet. That is, the authentication unit 101 executes authentication based on the wireless communication ID that is contained in the advertising packet transmitted from the user terminal 20 to the authentication terminal 30. This wireless communication ID is a wireless communication ID to serve as a query in authentication.

[Reception Unit]

The reception unit 102 is implemented mainly by the control unit 11. The reception unit 102 is configured to receive any data from the user terminal 20 or the authentication terminal 30. For example, the reception unit 102 receives a request to assign a new wireless communication ID from the user terminal 20 each time a predetermined application recorded in the user terminal 20 of the user is activated. This application is an application to be used in authentication. The application is installed in the user terminal 20 in advance. The wireless communication ID assigned to the user may be recorded as part of the application in the user terminal 20.

An assignment request is notification for requesting assignment of a new wireless communication ID. The assignment is requested by transmitting data having a predetermined format. The assignment request may also be expressed as notification of the activation of the application, or notification for requesting update of the wireless communication ID. The reception unit 102 receives, from the user terminal 20, the assignment request transmitted when the application is activated.

[Acquisition Unit]

The acquisition unit 103 is implemented mainly by the control unit 11. The acquisition unit 103 is configured to acquire, for each of a plurality of registered wireless communication IDs, the number of pieces of information indicating a facial feature amount that are associated with the wireless communication ID. This number can be paraphrased as the number of users to which the wireless communication ID is assigned.

A registered wireless communication ID is a wireless communication ID with which at least one piece of information indicating a facial feature amount has been associated. In other words, a registered wireless communication ID is a wireless communication ID that has been associated with at least one user, a wireless communication ID that has been used by at least one user, or a wireless communication ID that has been recorded in at least one user terminal 20. For example, a registered wireless communication ID is a wireless communication ID that has been registered in at least one of the user database DB1 and the ID database DB2.

There can be a wireless communication ID that has once been assigned to one of the users but is no longer assigned to any user after update resulting from the activation of the application. A record of this wireless communication ID may remain in the ID database DB2, and this wireless communication ID may therefore qualify as a registered wireless communication ID. In this embodiment, a wireless communication ID stored in at least one of the user database DB1 and the ID database DB2 corresponds to a registered wireless communication ID.

When one wireless communication ID is assigned per user as in this embodiment, the number acquired by the acquisition unit 103 is a user count indicating the number of users who are using the wireless communication ID. A plurality of wireless communication IDs may be assigned per user. In this embodiment, a relationship between the wireless communication ID and the user count is stored in the ID database DB2, and the acquisition unit 103 accordingly acquires the user count by referring to the ID database DB2.

[Selection Unit]

The selection unit 104 is implemented mainly by the control unit 11. The selection unit 104 is configured to select a plurality of candidates that are some of a plurality of registered wireless communication IDs, when a user is to be assigned a wireless communication ID.

A case in which a user is to be assigned a wireless communication ID equals satisfaction of a condition for executing processing of selecting candidates. In this embodiment, reception of the assignment request at the reception unit 102 corresponds to the case in which a user is to be assigned a wireless communication ID. The selection unit 104 accordingly selects a plurality of candidates when the assignment request is received. The condition described above can be any condition and may be, for example, the arrival of a predetermined date and time, or an act of accessing the server 10 that is performed by the user terminal 20. To give another example, the execution of authentication executed a predetermined number of times with the use of the same wireless communication ID may correspond to the condition.

The candidates are wireless communication IDs that may be assigned to the user. In other words, the candidates are a population of a wireless communication ID to be assigned to the user. In this embodiment, a case in which the candidates are registered wireless communication IDs is described. However, a new wireless communication ID may be included as a candidate. That is, the candidates may include not only a wireless communication ID that has been assigned to at least one user but also a wireless communication ID that has not been assigned to anyone.

The selection unit 104 selects, as a plurality of candidates, a plurality of wireless communication IDs that are some of all registered wireless communication IDs. For example, when there are "n" ("n" is an integer equal to or more than 2) registered wireless communication IDs, the selection unit 104 selects "k" ("k" is an integer equal to or more than 2 and less than "n") wireless communication IDs as the plurality of candidates. In this embodiment, a case in which "k" has a numerical value of "10" and the selection unit 104 selects ten candidates is described. However, the number of candidates to be selected is not limited to ten. The selection unit 104 may select any number of candidates, for example, a number of candidates between two candidates and nine candidates, or eleven or more candidates. The number of candidates to be selected by the selection unit 104 (the numerical value of "k") may be a fixed value or a variable. For instance, this number may vary depending on the user count stored in the ID database DB2.

The selection unit 104 selects a plurality of candidates by, for example, selecting a plurality of wireless communication IDs in ascending order of the user count from the plurality of registered wireless communication IDs. In this embodiment, a case in which the selection unit 104 selects "k" wireless communication IDs in ascending order of the user count stored in the ID database DB2 is described. The selection unit 104, however, may select as many candidates as possible until a total user count reaches a predetermined count as in modification examples described later. The selection unit 104 may also select "k" wireless communication IDs at random from the plurality of registered wireless communication IDs without taking the user count into consideration.

In this embodiment, the selection unit 104 selects, at random, a plurality of candidates that are some of a plurality of candidates selected in ascending order of the user count. For example, the selection unit 104 selects "m" ("m" is an integer equal to and more than 2 and less than "k") candidates at random out of "k" candidates selected in the manner described above. That is, the temporarily selected "k" candidates are narrowed down to "m" candidates to be processed by determination of the assignment unit 105 described later. Various known methods can be used as the method of random selection. For example, the selection unit 104 may use a random number to select "m" candidates out of "k" candidates.

When the plurality of candidates selected in ascending order of the user count do not include candidates that are not associated with a facial feature amount that is the same as or similar to the user's facial feature amount, the selection unit 104 selects at least one wireless communication ID that is in the next place in ascending order of the user count, to thereby select at least one next candidate. That is, when a candidate to be assigned to the user is not found among the initially selected "k" candidates, the selection unit 104 selects a next candidate. It is sufficient to select at least one next candidate, and the selection unit 104 is not always required to select a plurality of next candidates. It is sufficient for the selection unit 104 to select, as the next candidate, at least one wireless communication ID in ascending order from among wireless communication IDs that have not been selected.

[Assignment Unit]

The assignment unit 105 is implemented mainly by the control unit 11. The assignment unit 105 is configured to assign, as the user's wireless communication ID, a candidate that is not associated with a facial feature amount that is the same as or similar to the user's facial feature amount, out of a plurality of candidates selected by the selection unit 104. That is, the assignment unit 105 assigns, as the user's wireless communication ID, a candidate that is not being used by another user who resembles the user in facial features out of a plurality of candidates. The assignment unit 105 assigns one of a plurality of candidates as the user's wireless communication ID so that duplication of a wireless communication ID among users who resemble one another in facial features is avoided.

Assignment of a wireless communication ID to a user equals determination of the wireless communication ID as a wireless communication ID to be used by the user. That is, storing of a wireless communication ID in a user's record of the user database DB1 corresponds to assignment of the wireless communication ID to the user. In this embodiment, the wireless communication ID is recorded in the user terminal 20 and determination of a wireless communication ID as a wireless communication ID to be recorded in the user terminal accordingly corresponds to assignment of the wireless communication ID to the user.

Authentication in this embodiment is executed based on similarity in facial feature amount. Accordingly, when a plurality of candidates are not associated with a facial feature amount similar to the user's facial feature amount, the assignment unit 105 assigns one of the plurality of candidates as the user's wireless communication ID based on each facial feature amount associated with one of the plurality of candidates and on the user's facial feature amount. There is a possibility of coincidence in which one user and another user have the same facial feature amount, and a candidate associated with a facial feature amount that is the same as the user's facial feature amount is therefore not assigned to the user.

The assignment unit 105 refers to the user database DB1 to acquire, for each candidate selected by the selection unit 104, a facial feature amount associated with the candidate. The assignment unit 105 determines, for each candidate, whether the facial feature amount associated with the candidate is similar to the user's facial feature amount. When a candidate is associated with even one piece of information indicating a facial feature amount that is similar to the user's facial feature amount, the assignment unit 105 does not determine the candidate as a wireless communication ID to be assigned to the user. The assignment unit 105 determines, as a wireless communication ID to be assigned to the user, a candidate that is associated with not even one piece of information indicating a feature amount that is similar to the user's facial feature amount.

When there are a plurality of candidates qualified to be determined as a wireless communication ID to be assigned to the user, the assignment unit 105 may select one of the plurality of candidates at random. In this embodiment, however, the assignment unit 105 identifies, for each candidate that is not associated with a facial feature amount similar to the user's facial feature amount, a facial feature amount most similar to the user's facial feature amount out of pieces of information indicating a facial feature amount that are associated with the candidate. The assignment unit 105 compares the identified facial feature amount of one candidate and the identified facial feature amount of another candidate to acquire, as the user's wireless communication ID, a candidate associated with the facial feature amount that is least similar to the user's facial feature amount.

Figure 7:
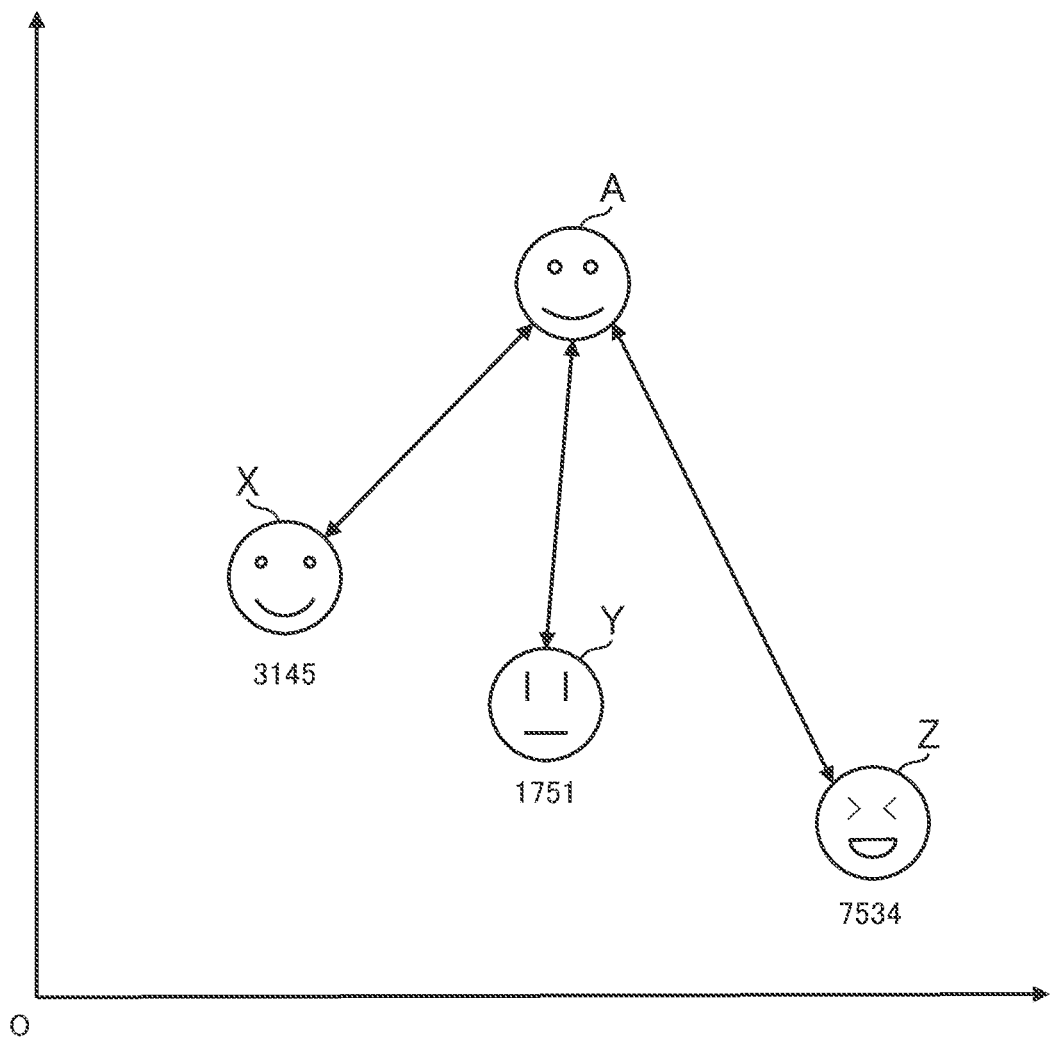
FIG. 7 is a graph for showing an example of a case in which there are a plurality of candidates qualified to be determined as a wireless communication ID to be assigned to a user.

FIG. 7 is a graph for showing an example of a case in which there are a plurality of candidates qualified to be determined as a wireless communication ID to be assigned to a user. Coordinate axes shown in FIG. 7 are coordinate axes of a vector space in which a facial feature amount is plotted. In the example of FIG. 7, a case in which three candidates "3145", "1751", and "7534" qualify to be determined as a wireless communication ID to be assigned to User A, who have activated the application, is shown.

For example, the assignment unit 105 acquires a distance D1 to User X whose face resembles the face of User A most among users to whom the candidate "3145" is assigned. This distance is a distance between one facial feature amount and another facial feature amount. The assignment unit 105 also acquires, for example, a distance D2 to User Y whose face resembles the face of User A most among users to whom the candidate "1751" is assigned. Further, for example, the assignment unit 105 acquires a distance D3 to User Z whose face resembles the face of User A most among users to whom the candidate "7534" is assigned.

The assignment unit 105 determines, out of the three candidates, the candidate "7534" related to the longest distance of the distances D1 to D3 as a wireless communication ID to be assigned to the user. Although each of the three candidates is a candidate suitable as a wireless communication ID to be assigned to User A, a situation in which User A is authenticated as another user can more reliably be prevented by assigning the candidate "7534" to User A.

In this embodiment, the assignment unit 105 determines whether a facial feature amount that is the same as or similar to the user's facial feature amount is associated with a plurality of candidates ("m" candidates) selected at random by the selection unit 104. The random selection by the selection unit 104 and the determination by the assignment unit 105 are repeated until a candidate that is not associated with a facial feature amount that is the same as or similar to the user's facial feature amount is found.

For example, the assignment unit 105 searches the user database DB1 in which a facial feature amount and wireless communication ID of each of a plurality of other users are stored, based on one query that includes a plurality of candidates selected by the selection unit 104. The assignment unit 105 assigns a wireless communication ID to the user based on a result of the search of the user database DB1. The assignment unit 105 searches the user database DB1 based not on a plurality of queries respectively corresponding to the plurality of candidates selected by the selection unit 104, but on one query with a plurality of candidates as elements of an OR condition. In this embodiment, "m" candidates out of "k" candidates are selected at random, and the one query is accordingly a string of "m" candidates arranged in a pattern of an OR condition.

In this embodiment, a request to assign a new wireless communication ID is transmitted when the user activates the application, and the assignment unit 105 accordingly assigns a new wireless communication ID to the user from among a plurality of candidates. When a suitable candidate is not found among "k" candidates selected by the selection unit 104, the assignment unit 105 determines whether newly selected candidates include a suitable candidate. When the determination performed on all registered wireless communication IDs still fails to present a suitable candidate, the assignment unit 105 may assign a newly created wireless communication ID to the user.

In the case of authentication information for password authentication and the like that determines success or failure by whether pieces of authentication information match instead of similarity between pieces of authentication information, the assignment unit 105 assigns the user a candidate (in this embodiment, a wireless communication ID) that is not associated with the same first information as the user's first information (a password or the like). In this case, a candidate associated with the first information that is similar to but is not a match to the user's first information (a password or the like) may be assigned to the user.

[Transmission Unit]

The transmission unit 106 is implemented mainly by the control unit 11. The transmission unit 106 is configured to transmit any data to the user terminal 20 or the authentication terminal 30. For example, the transmission unit 106 transmits a wireless communication ID assigned by the assignment unit 105 to the user terminal 20. To give another example, the transmission unit 106 transmits a result of authentication by the authentication unit 101 to the authentication terminal 30.

[3-2. Functions Implemented in User Terminal]

As illustrated in FIG. 4, a data storage unit 200, a transmission unit 201, and a reception unit 202 are implemented in the user terminal 20.

[Data Storage Unit]

The data storage unit 200 is implemented mainly by the storage unit 22. The data storage unit 200 is configured to store data required for registration application and authentication. For example, the data storage unit 200 stores data of the user's face photograph. The data storage unit 200 stores the user's wireless communication ID.

[Transmission Unit]

The transmission unit 201 is implemented mainly by the control unit 21. The transmission unit 201 is configured to transmit any data to the server 10 or the authentication terminal 30. For example, the transmission unit 201 transmits an assignment request to the server 10. The transmission unit 201 also transmits to the authentication terminal 30, for example, the wireless communication ID stored in the data storage unit 200 with the use of wireless communication. In this embodiment, the transmission unit 201 transmits an advertising packet in which the wireless communication ID is stored.

[Reception Unit]

The reception unit 202 is implemented mainly by the control unit 21. The reception unit 202 is configured to receive any data from the server 10 or the authentication terminal 30. For example, the reception unit 202 receives a wireless communication ID assigned to the user from the server 10. The wireless communication ID is recorded in the data storage unit 200.

[3-3. Functions Implemented in Authentication Terminal]

As illustrated in FIG. 4, a data storage unit 300, a transmission unit 301, a reception unit 302, and a processing execution unit 303 are implemented in the authentication terminal 30. In this embodiment, a case in which the authentication terminal 30 is included in the authentication system S is described. The authentication terminal 30, however, may be an external device that can hold communication to and from the authentication system S.

[Data Storage Unit]

The data storage unit 300 is mainly implemented by the storage unit 32. The data storage unit 300 is configured to store data required for authentication. For example, the data storage unit 300 stores the IP address of the server 10 and other information. The data storage unit 300 also stores, for example, a wireless communication ID received from the user terminal 20. The data storage unit 300 may store, for example, for each wireless communication ID received from the user terminal 20, a distance to the user terminal 20. To give another example, the data storage unit 300 stores the authentication terminal ID by which the authentication terminal 30 is uniquely identified.

[Transmission Unit]

The transmission unit 301 is implemented mainly by the control unit 31. The transmission unit 301 is configured to transmit any data to the server 10 or the user terminal 20. For example, the transmission unit 301 transmits the authentication terminal ID as well as a wireless communication ID received from the user terminal 20 to the server 10.

[Reception Unit]

The reception unit 302 is implemented mainly by the control unit 31. The reception unit 302 is configured to receive any data from the server 10 or the user terminal 20. For example, the reception unit 302 receives a wireless communication ID from the user terminal 20 with the use of wireless communication. In this embodiment, the reception unit 302 receives an advertising packet in which the wireless communication ID is stored. The reception unit 302 also receives, for example, a result of authentication from the server 10.

[Processing Execution Unit]

The processing execution unit 303 is implemented mainly by the control unit 31. The processing execution unit 303 is configured to execute predetermined processing when authentication succeeds. The predetermined processing is as described above, and is processing allowed to be executed when authentication is a success. In this embodiment, when authentication succeeds, the security gate SG is unlocked. The processing execution unit 303 accordingly unlocks the security gate by, for example, causing a motor of a lock mechanism to rotate, when a notification indicating success of authentication is received, and does not unlock the security gate when a notification indicating success of authentication is not received. The predetermined processing is not limited to the example of this embodiment, and may be any processing.

[4. Processing Executed in this Embodiment]

Processing executed in the authentication system S is described next. Here, assignment processing for assigning a wireless communication ID to a user and authentication processing for executing authentication of a user are described. Processing described below is an example of processing executed by the function blocks that are illustrated in FIG. 4.

[4-1. Assignment Processing]

Figure 8:
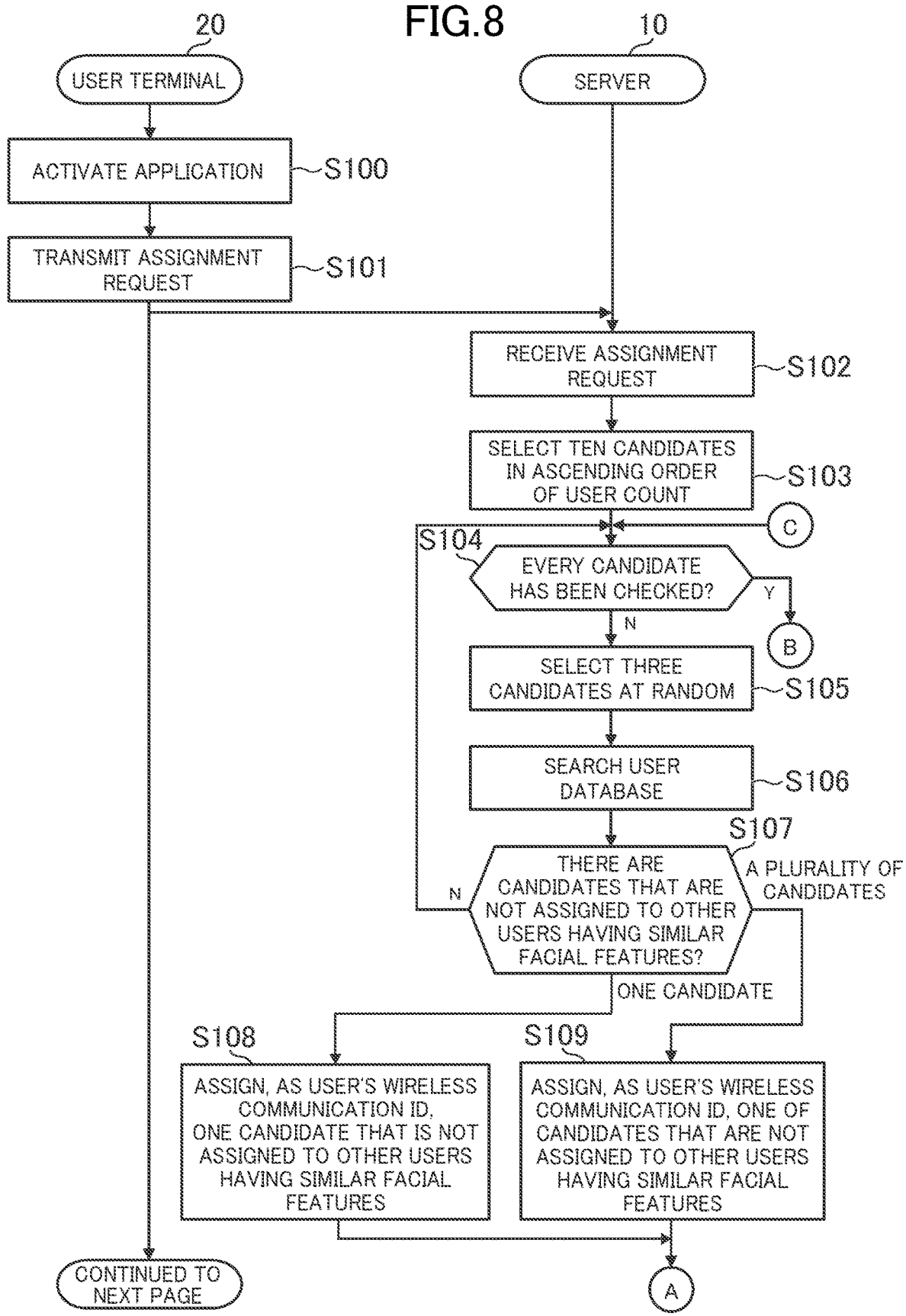
FIG. 8 is a flow chart for illustrating an example of assignment processing.
Figure 9:
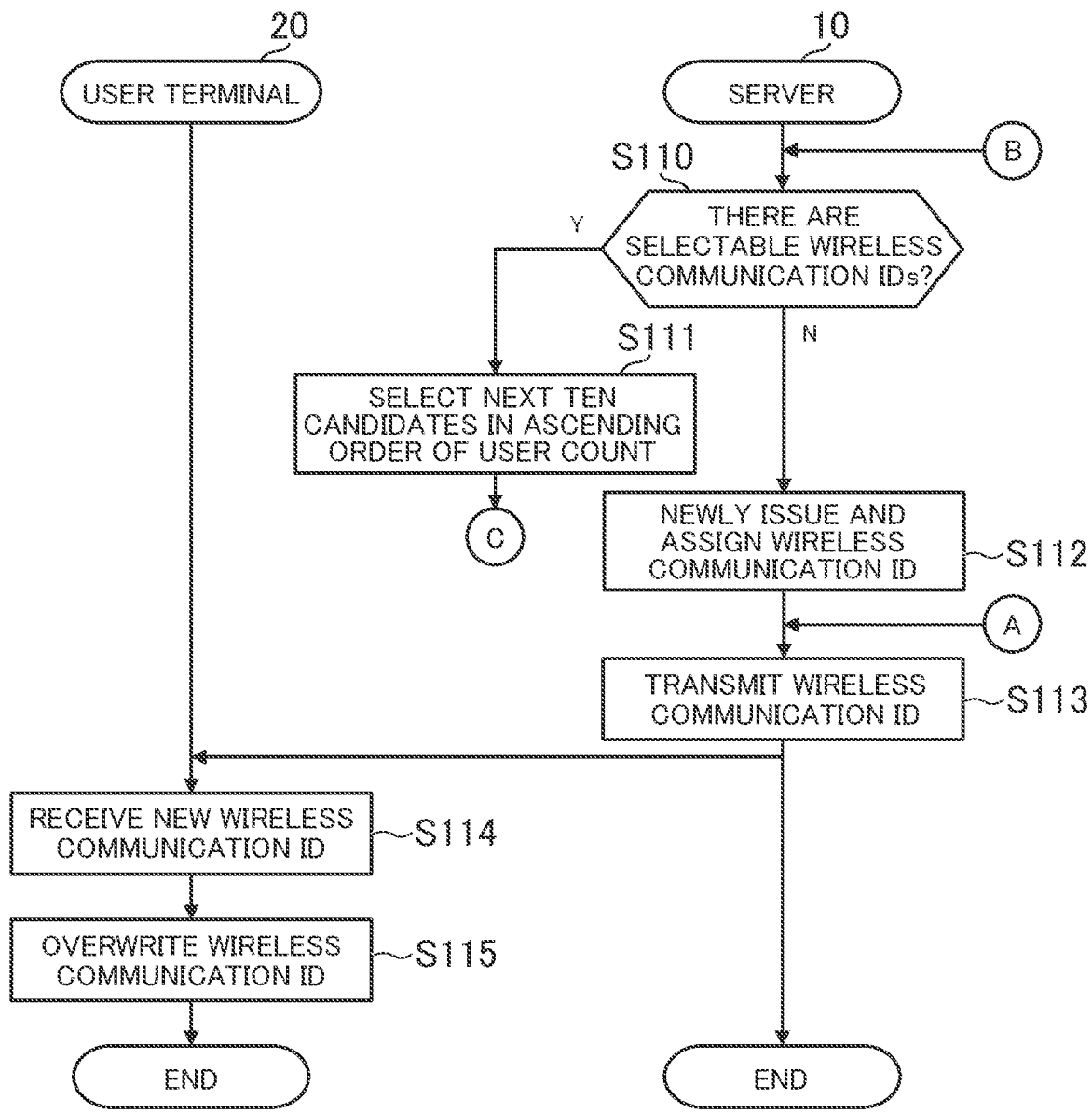
FIG. 9 is a flow chart for illustrating the example of the assignment processing.

FIG. 8 and FIG. 9 are flow charts for illustrating an example of the assignment processing. The assignment processing illustrated in FIG. 8 and FIG. 9 is executed by the control unit 11 and the control unit 21 by operating in accordance with a program that is stored in the storage unit 12 and a program that is stored in the storage unit 22, respectively. Prior to the execution of the assignment processing, the user finishes user registration.

As illustrated in FIG. 8, the user terminal 20 activates the application stored in the storage unit 22, based on the user's operation (Step S100), and transmits an assignment request for assignment of a new wireless communication ID to the server 10 (Step S101). In this embodiment, the user ID is stored in the storage unit 22 and is included in the assignment request.

The server 10 receives the assignment request from the user terminal 20 (Step S102) and, based on the ID database DB2, selects ten candidates in ascending order of the user count out of all registered wireless communication IDs (Step S103). The number of registered wireless communication IDs is more than ten. It is assumed here that there are, for example, several ten to several thousand registered wireless communication IDs, or more.

The server 10 determines whether every selected candidate has been checked (Step S104). In Step S104, the server 10 determines, for every candidate selected in Step S103, or Step S111 described later, whether processing of Step S105 and subsequent steps have been executed.

When it is determined that not every selected candidate has been checked (Step S104: N), that is, when even one candidate is left unchecked, the server 10 selects three candidates at random from candidates that have not been checked (Step S105). In Step S105, the server 10 narrows the unchecked candidates down to candidates to be processed by processing of Step S106 and subsequent steps. When the number of unchecked candidates is equal to or less than three, the server 10 selects all candidates that have not been checked.

The server 10 searches the user database DB1 based on the three candidates selected in Step S105 (Step S106). In Step S106, the server 10 creates one query including all of the candidates selected in Step S105. The server 10 sends the created query to the user database DB1 to execute the search. That is, the server 10 searches with the use of a query in which the three candidates are compiled into one, instead of three queries that correspond to the three candidates selected in Step S105, respectively. This query is created by connecting the three candidates by an OR condition. The server 10 acquires, as a result of the search, each facial feature amount that is associated with one of the candidates selected in Step S105.

The server 10 checks each facial feature amount found in the search of Step S106 to determine whether another user resembles the user in facial features (that is, whether there is a facial feature amount that is the same as or similar to the user's facial feature amount) (Step S107). In Step S107, the server 10 determines whether records found in the search of Step S106 include a record of another user who resembles the user in facial features. The server 10 calculates, for each facial feature found in the search of Step S106, a distance between the facial feature amount and the facial feature amount of the user who has activated the application (a facial feature amount stored in the user database DB1 in association with the user ID included in the assignment request). The server 10 determines whether there is at least one distance less than a threshold value. When not even one calculated distance is less than the threshold value, this corresponds to the absence of another user whose face resembles the user's face.

When it is determined in Step S107 that one candidate is not associated with another user whose face resembles the user's face (Step S107: one candidate), the server 10 assigns this candidate as a wireless communication ID of the user (Step S108). In Step S108, the server 10 stores the wireless communication ID in the user's record in the user database DB1 to update the ID database DB2.

When it is determined in Step S107 that a plurality of candidates are not associated with another user whose face resembles the user's face (Step S107: plurality of candidates), the server 10 assigns one of the plurality of candidates as a wireless communication ID of the user (Step S109). In Step S109, the server 10 stores the wireless communication ID in the user's record in the user database DB1 to update the ID database DB2. For example, as described with reference to FIG. 7, the server 10 may assign a candidate associated with a facial feature amount that is farthest in distance from the user's facial feature amount, out of the plurality of candidates that are not associated with another user whose face resembles the user's face.

When it is determined in Step S107 that there is no candidate that is not associated with a user having a similar face (Step S107: N), the processing returns to processing of Step S104. When there is a candidate that has not been checked, the result of the determination of Step S104 is negative, and processing of Step S105 and subsequent steps is executed for the candidate that has not been checked.

When it is determined in Step S104 that every candidate has been checked (Step S104: Y), the processing proceeds to a step illustrated in FIG. 9, and the server 10 determines whether there are still wireless communication IDs that can be selected (Step S110). When it is determined that there are selectable wireless communication IDs (Step S110: Y), the server 10 selects next ten candidates in ascending order of the user count based on the ID database DB2 (Step S111), and the processing proceeds to the processing of Step S104. In this case, the next ten candidates in ascending order of the user count are candidates to be checked.

When it is determined in Step S110 that there are no selectable wireless communication IDs (Step S110: N), the server 10 newly issues a wireless communication ID and assigns the issued ID as a wireless communication ID of the user (Step S112). In Step S112, the server 10 newly creates a wireless communication ID. The server 10 stores the wireless communication ID in the user's record in the user database DB1, and updates the ID database DB2.

The server 10 transmits the wireless communication ID assigned to the user in Step S108, Step S109, or Step S112 to the user terminal 20 (Step S113). The user terminal 20 receives the new wireless communication ID (Step S114), and overwrites the wireless communication ID stored in the storage unit 22 (Step S115), at which point this processing is ended. The old wireless communication ID is deleted from the user terminal 20.

[4-2. Authentication Processing]

Figure 10:
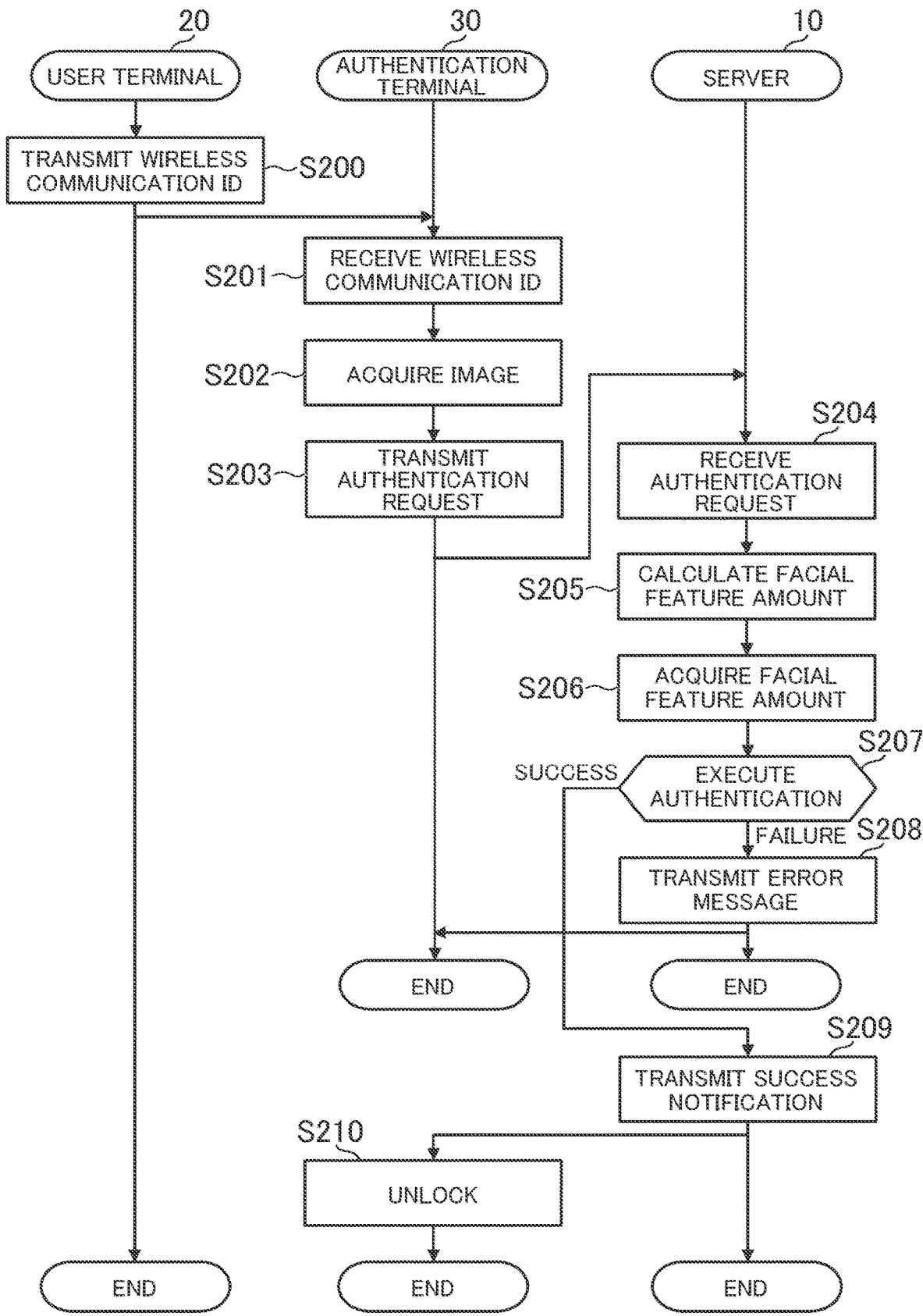
FIG. 10 is a flow chart for illustrating an example of authentication processing.

FIG. 10 is a flow chart for illustrating an example of the authentication processing. The authentication processing illustrated in FIG. 10 is executed by the control unit 11, the control unit 21, and the control unit 31 by operating in accordance with a program that is stored in the storage unit 12, a program that is stored in the storage unit 22, and a program that is stored in the storage unit 32, respectively. Prior to the execution of the authentication processing, the user finishes user registration. When the assignment processing is complete, there is the latest wireless communication ID recorded in the user terminal 20.

As illustrated in FIG. 10, the user terminal 20 uses wireless communication to transmit the wireless communication ID stored in the storage unit 22 (Step S200). In Step S200, the user terminal 20 stores the wireless communication ID in an advertising packet and transmits the advertising packet to surroundings of the user terminal 20. The communication unit 23 is powered on in advance. When the power of the communication unit 23 is off, the communication unit 23 may be powered on in response to the user's operation, or may automatically be powered on upon detection of approach to the authentication terminal 30 with the use of position information of GPS or the like.

The authentication terminal 30 uses wireless communication to receive the wireless communication ID transmitted from the user terminal 20 (Step S201). In Step S201, the authentication terminal 30 records the received wireless communication ID in the storage unit 32. The wireless communication ID is deleted from the storage unit 32 at discretionary timing. This timing is success of authentication, the elapse of a fixed length of time, cessation of reception of a wireless communication ID through wireless communication, or the like.

The authentication terminal 30 acquires an image based on a detection signal of the photographing unit 36 (Step S202). In Step S202, the authentication terminal 30 acquires an image when detecting, from a decrease of distance to the user terminal 20 to a value less than a threshold value, that the user has entered the effective authentication area A2. The authentication terminal 30 transmits an authentication request including the wireless communication ID to the server (Step S203). The authentication request is issued by transmission of data having a predetermined format, and includes, for example, the authentication terminal ID, the wireless communication ID, and the image.

The server 10 receives the authentication request from the authentication terminal 30 (Step S204), and calculates a facial feature amount based on the image included in the authentication request (Step S205). The server 10 acquires each facial feature amount with which the wireless communication ID included in the authentication request is associated, based on the user database DB1 (Step S206).

The server 10 executes authentication based on the feature amount calculated in Step S205 and each feature amount acquired in Step S206 (Step S207). In Step S207, the server 10 calculates, for each feature amount acquired in Step S206, a distance from the feature amount calculated in Step S205 to the acquired feature amount. When the distance to some feature amount acquired in Step S206 is less than a threshold value, authentication is a success. When no feature amount acquired in Step S206 is at a distance less than the threshold value, authentication is a failure.

When authentication fails (Step S207: failure), the server 10 transmits an error message to the authentication terminal 30 (Step S208), and this processing is ended. In this case, the error message is displayed on the display unit 35 of the authentication terminal 30 to notify the user that authentication has not succeeded.

When authentication succeeds (Step S207: success), on the other hand, the server 10 transmits success notification indicating that authentication has succeeded to the authentication terminal 30 (Step S209). The success notification is issued by transmission of data having a predetermined format. The authentication terminal 30 receives the success notification and unlocks the security gate SG (Step S210), at which point this processing is ended.

According to the authentication system S of this embodiment, when a user is to be assigned a wireless communication ID, a processing load on the server 10 can be lightened by selecting some of a plurality of registered wireless communication IDs as a plurality of candidates, and assigning a candidate that is not associated with a facial feature amount that is the same as or similar to the user's facial feature amount as the user's wireless communication ID. The processing load on the server 10 can be lightened by, for example, reducing the number of pieces of information indicating a facial feature amount to be compared, because comparison between the user's facial feature amount and another user's facial feature amount that is associated with a wireless communication ID is not required for every wireless communication ID in the user database DB1. A processing load on the server 10 for, for example, database search can also be lightened because selection of one candidate at a time and transmission of one query at a time to the user database DB1 are not required. In addition, the security of the authentication system S can be enhanced by reliably distinguishing users who have similar facial features from one another and thus preventing false authentication or impersonation.

The authentication system S can also prevent depletion of wireless communication IDs by assigning, when there are a plurality of candidates that are not associated with a facial feature amount similar to the user's facial feature amount, one of the plurality of candidates as the user's wireless communication ID, based on each facial feature amount associated with one of the plurality of candidates and on the user's facial feature amount. A shortage of wireless communication IDs available for use by the authentication system S overall may be caused by, for example, assigning a plurality of wireless communication IDs to the user. Depletion of wireless communication IDs can be prevented by assigning one suitable wireless communication ID per user.

The authentication system S identifies, for each candidate that is not associated with a facial feature amount similar to the user's facial feature amount, a facial feature amount most similar to the user's facial feature amount out of pieces of information indicating a facial feature amount that are associated with the candidate, and compares the identified facial feature amount of one candidate and the identified facial feature amount of another candidate to acquire, as the user's wireless communication ID, a candidate associated with the facial feature amount that is least similar to the user's facial feature amount. The authentication system S can thus more reliably distinguish users who have similar facial features from one another and more reliably prevent false authentication or impersonation, with the result that the security of the authentication system S is effectively enhanced.

The authentication system S acquires, for each of a plurality of registered wireless communication IDs, the number of pieces of information indicating a facial feature amount that are associated with the wireless communication ID, and selects a plurality of wireless communication IDs in ascending order of the acquired number out of the plurality of registered wireless communication IDs, to thereby select a plurality of candidates. The authentication system S thus decreases the number of items to be compared to the user's facial feature amount and can consequently lighten the processing load on the server 10 more effectively.

The authentication system S uses the selection unit 104 to select, at random, some of a plurality of candidates selected in ascending order of the user count, and repeats the random selection by the selection unit 104 and determination by the assignment unit 105 until a candidate that is not associated with a facial feature amount that is the same as or similar to the user's facial feature amount is found. The authentication system S can thus assign a wireless communication ID suitable for the user as well as lighten the processing load on the server 10. The random selection also simplifies the processing of selecting "m" candidates from "k" candidates and, accordingly, the processing load on the server 10 can effectively be lightened.

When a plurality of candidates selected in ascending order of the user count does not include a candidate that is not associated with a facial feature amount that is the same as or similar to the user's facial feature amount, the authentication system S selects at least one wireless communication ID that is next in ascending order of the user count, to thereby select at least one next candidate. The authentication system S can thus assign a wireless communication ID suitable for the user as well as lighten the processing load on the server 10.

The authentication system S searches the user database DB1 in which a facial feature amount and wireless communication ID of each of a plurality of other users are stored, based on one query including a plurality of candidates, and assigns a wireless communication ID to the user based on a result of the search of the user database DB1. The authentication system S can thus lighten a processing load on the server 10 for database search.

The authentication system S receives, each time a predetermined application recorded in the user terminal 20 of the user is activated, an assignment request to assign a new wireless communication ID from the user terminal. When receiving the assignment request, the authentication system S selects a plurality of candidates and assigns a new wireless communication ID to the user from the plurality of candidates, to thereby increase the frequency of updating the wireless communication ID. As a result, the user is prevented from continuing to use an old wireless communication ID, and the security of the authentication system S can thus be enhanced.

The authentication system S records a wireless communication ID assigned to the user in the user terminal 20 of the user, and acquires information required for authentication with the use of the authentication terminal 30, to thereby enhance user-friendliness. For instance, as in FIG. 3, authentication can be executed without requiring the user to take out the user terminal 20 or input some information to the authentication terminal 30. In addition, the risk of leakage of the user ID is reduced because authentication is executable without transmitting the user ID from the user terminal 20 to the authentication terminal 30 as in FIG. 3.

In the authentication system S, the user terminal 20 uses an advertising packet in a predetermined wireless communication standard to transmit the wireless communication ID to the authentication terminal 30, to thereby enable authentication without pairing. As a result, user-friendliness is effectively enhanced.

The authentication system S can also lighten a processing load applied to the server 10 when biometric authentication is executed, by using the first information that is biometric information and the second information that is identification information associated with the biometric information.

5. Modification Examples

The present disclosure is not limited to the embodiment described above, and can be modified suitably without departing from the spirit of the present disclosure.

(1) For example, although a case of selecting "m" candidates at random after selecting "k" candidates in ascending order of the user count is described in the embodiment, the method of selecting candidates is not limited to the example of the embodiment. The selection unit 104 may select candidates at random until the total user count reaches a predetermined count. The predetermined count may be any number, and may be a fixed value or a variable. For example, the selection unit 104 may select as many candidates as possible at random after selecting "k" candidates in ascending order of the user count, until the total user count indicating the sum of user counts stored in the ID database DB2 reaches a predetermined count. In this modification example, the value of "m" is variable.

Each time at least one candidate is selected at random from the "k" candidates, the selection unit 104 adds the user count of the selected candidate to obtain the sum of the user counts of the candidates that have been selected. The selection unit 104 determines whether the total user count has reached the predetermined count. When it is determined that the total user count has not reached the predetermined count, the selection unit 104 selects at least one candidate from candidates that have not been selected. The selection of a candidate is repeated from then on until the total user count reaches the predetermined count. When it is determined that the total user count has reached the predetermined count, the selection unit 104 stops selecting a candidate. Processing executed after the candidates are selected is as described in the embodiment.

According to Modification Example (1) of the present disclosure, candidates are selected in a large number that is not so large as to increase the processing load on the server 10, by selecting candidates at random until the total user count reaches a predetermined count, and the search for a wireless communication ID suitable for the user is consequently facilitated. For example, as described with reference to FIG. 7, this facilitates the search for a wireless communication ID associated with a facial feature amount that is longer in distance to the user's facial feature amount. As a result, false authentication or impersonation is more reliably prevented, and the security of the authentication system S is effectively enhanced.

(2) For example, although a case in which "k" wireless communication IDs are selected as candidates in ascending order of the user count is described in the embodiment, the selection unit 104 may select a plurality of candidates by selecting a plurality of wireless communication IDs in ascending order of the user count until the total user count reaches a predetermined count. The predetermined count may be any number, and may be a fixed value or a variable. That is, as many candidates as possible may be selected in ascending order of the user count in the manner of Modification Example (1) in the first candidate selection by the selection unit 104 as well. In this modification example, the value of "k" is variable. The value of "m" may be variable as in Modification Example (1) or may be fixed as in the embodiment.

The selection unit 104 refers to the ID database DB2 to select at least one candidate in ascending order of the user count. Each time a candidate is selected, the selection unit 104 adds the user count of the selected candidate to obtain the sum of the user counts of the candidates that have been selected. The selection unit 104 determines whether the total user count has reached the predetermined count. When it is determined that the total user count has not reached the predetermined count, the selection unit 104 selects at least one candidate from candidates that have not been selected in ascending order of the user count. The selection of a candidate is repeated from then on until the total user count reaches the predetermined count. When it is determined that the total user count has reached the predetermined count, the selection unit 104 stops selecting a candidate. Processing executed after the candidates are selected is as described in the embodiment.

According to Modification Example (2) of the present disclosure, candidates are selected in a large number that is not so large as to increase the processing load on the server 10, by selecting, as a plurality of candidates, a plurality of wireless communication IDs in ascending order of the user count until the total user count reaches a predetermined count, and the search for a wireless communication ID suitable for the user is consequently facilitated. For example, as described with reference to FIG. 7, this facilitates the search for a wireless communication ID associated with a facial feature amount that is longer in distance to the user's facial feature amount. As a result, false authentication or impersonation is more reliably prevented, and the security of the authentication system S is effectively enhanced.

(3) For example, although a case of enhancing security by updating the wireless communication ID each time the application is activated is described in the embodiment, some users may not often activate the application. An expiration date may therefore be set to a wireless communication ID so that the user is notified of expiration of the expiration date, or approach to expiration of the expiration date.

FIG. 11 is a function block diagram of Modification Example (3) of the present disclosure. As illustrated in FIG. 11, a setting unit 107 is implemented in Modification Example (3) in addition to the functions described in the embodiment. The setting unit 107 is implemented mainly by the control unit 11. The setting unit 107 is configured to set an expiration date to the wireless communication ID recorded in the user terminal 20. The expiration date is stored in the user database DB1. The expiration date can have any length, for example, from several hours to several weeks. The length of the expiration date may vary from user to user. When a wireless communication ID is assigned by the assignment unit 105, the setting unit 107 sets, as the expiration date, a point in time that is after a predetermined length of time since the time of assignment.

In a case in which the expiration date has passed or a case in which expiration of the expiration date approaches, the transmission unit 106 transmits an activation request for requesting to activate the application to the user. The case in which the expiration date has passed is a case in which the current date is after the expiration date. The case in which expiration of the expiration date approaches is a case in which a length from the current date to the expiration date is less than a threshold value (for example, from several hours to several days or so). The current date may be acquired by using a real-time clock, a GPS signal, or the like.

The activation request is notification for requesting activation of the application. The activation request is issued by transmission of data having a predetermined format. When receiving the activation request, the user terminal 20 displays predetermined notification on the display unit 25. The notification may use any method, for example, push notification, banner notification, badge notification, or audio notification. The activation request includes a message prompting activation of the application. The activation request may use other media including electronic mail, an SNS, or messaging applications.

According to Modification Example (3), an expiration date is set to the wireless communication ID recorded in the user terminal 20 and, when the expiration date passes or expiration of the expiration date approaches, the activation request for requesting to activate the application is transmitted to the user. The frequency of updating the wireless communication ID can thus be increased and, as a result, the security of the authentication system S is enhanced.

(4) Further, for example, the modification examples described above may be combined.

For example, in the description given above, a facial feature amount is an example of the first information and a wireless communication ID is the second information. The combination of the first information and the second information, however, is not limited to the example of the embodiment. A combination of any types of authentication information can be employed as the first information and the second information. For instance, authentication may be executed by using the first information that is a facial feature amount and the second information that is a passcode. To give another example, authentication may be executed by using the first information that is a fingerprint pattern and the second information that is a wireless communication ID. To give still another example, authentication may be executed by using the first information that is a two-dimensional code and the second information that is a personal identification number.

Further, for example, although the embodiment takes as an example a scene in which a user attempts to pass the security gate SG, the authentication system S is also applicable to a scene in which a user purchases an article for sale or uses a service. In this case, the authentication terminal 30 is, for example, a vending machine, a ticket vending machine, a POS terminal, or a payment terminal at a store. When the user is successfully authenticated, settlement processing is executed to allow the user to purchase an article for sale or use a service. The application installed in the user terminal 20 in this case may be an application for electronic settlement. This application is capable of various types of electronic settlement including two-dimensional code settlement.

In this modification example, settlement information may be registered in the user database DB1 in advance so that, when one user is successfully authenticated, the processing execution unit executes settlement processing based on the user's settlement information. The settlement information referred to in the settlement processing is settlement information associated with the successfully authenticated user.

The settlement information is information required to perform settlement, for example, credit card information, account information of an electronic value (for example, electronic money or electronic reward points), account information of a virtual currency, bank account information, or debit card information. The settlement information is registered at the time of user registration, or other times, and is stored in, for example, the user database DB1 in association with the user ID. The settlement information may be stored in a database that is not the user database DB1.

The server 10 is only required to execute settlement processing depending on the settlement information, for example, credit processing based on credit card information, processing of subtracting from the balance of an electronic value, processing of subtracting from the balance of a virtual currency, processing of withdrawing from or depositing to a bank account, or processing of subtracting from the balance of an account that is indicated by the debit card information. The server 10 does not execute the settlement processing when authentication fails, and executes the settlement processing when authentication succeeds.

When the settlement processing is executed, a message to that effect is displayed on the display unit 35 of the authentication terminal 30, a terminal at the store, or the like, and the user receives an item for sale or use a service. For example, when the authentication terminal 30 is a digital signage device installed at a store or a similar location, and successful authentication notification is received from the server 10, a message indicating a success of authentication is displayed on the display unit 35. A clerk at the store checks the message and then hands over an article for sale to the user or provides a service to the user. The message may be forwarded to and displayed on a computer other than the authentication terminal 30, for example, a terminal operated by a store clerk. To give another example, when the authentication terminal 30 is a vending machine and successful authentication notification is received from the server 10, the authentication terminal 30 discharges an article for sale specified by the user, prepares a coffee or a similar drink, or cooks an instant or similar food product.

According to the modification examples described above, a processing load on the server 10 in electronic settlement and other services can be lightened. In addition, false authentication or impersonation among users who resemble one another in facial features is prevented, and security can accordingly be enhanced to a more than satisfactory level.

In another example, the authentication terminal 30 is not included and a wireless communication ID may be transmitted directly from the user terminal 20 to the server 10. The user terminal 20 in this case uses the photographing unit 26 to photograph the user's face when authentication is executed. The user terminal 20 transmits the wireless communication ID registered in the user terminal 20 itself and the image photographed by the photographing unit 26 to the server 10. The flow of processing subsequent to the reception of those by the server 10 is as described in the embodiment. When authentication succeeds, the server 10 transmits success notification to the user terminal 20. The user terminal 20 receives the success notification and executes predetermined processing. This processing can be any processing, for example, processing of logging in to the user terminal 20 or settlement processing.

In still another example, description has been given of the case in which main functions are implemented in the server 10, but the functions may be shared by a plurality of computers. For example, the functions may be shared among the server 10, the user terminal 20, and the authentication terminal 30. For example, the authentication processing may be executed in the user terminal 20 or the authentication terminal 30 instead of the server 10. Further, for example, when the authentication system S includes a plurality of server computers, the functions may be shared among the plurality of server computers. Still further, for example, the data described as being stored in the data storage unit 100 may be stored by a computer other than the server 10.

The invention claimed is:

1. An authentication system, comprising at least one processor; and
at least one memory device that stores a plurality of instructions which, when executed by the at least one processor, causes the at least one processor to:
execute authentication based on pieces of first information registered in advance and pieces of second information associated with the pieces of first information;
select, when a piece of the second information is to be assigned to a user, a plurality of candidates that are some of a plurality of registered pieces of the second information;
assign, as the user's piece of the second information, one of the plurality of candidates that is unassociated with pieces of the first information that are the same as or similar to a user's piece of the first information;

acquire, for each of the plurality of registered pieces of the second information, a count indicating how many pieces of the first information are associated with the registered piece of the second information, and select the plurality of candidates by selecting a plurality of pieces of the second information out of the plurality of registered pieces of the second information, in ascending order of the acquired count;

select, when the plurality of candidates selected in ascending order of the acquired count include no candidate that is unassociated with a piece of the first information that is the same as or similar to the user's piece of the first information, at least one next candidate by selecting at least one next piece of the second information in ascending order of the acquired count;

select the candidates at random until a total count indicating a sum of the acquired count acquired for every one of the plurality of registered pieces of the second information reaches a predetermined count.

2. The authentication system according to claim 1, wherein the authentication is executed based on similarity between pieces of the first information, and wherein the at least one processor is configured to assign, when the plurality of candidates include a plurality of candidates that are unassociated with pieces of the first information that are similar to the user's piece of the first information, one of the plurality of candidates as the user's piece of the second information, based on each piece of the first information that is associated with one of the plurality of candidates, and on the user's piece of the first information.

3. The authentication system according to claim 2, wherein the at least one processor is configured to:

identify, for each of the plurality of candidates that are unassociated with pieces of the first information that are similar to the user's piece of the first information, a piece of the first information most similar to the user's piece of the first information, out of pieces of the first information that are associated with the candidate; and acquire, as the user's piece of the second information, one of the plurality of candidates that is associated with the identified piece of the first information that is least similar to the user's piece of the first information, out of the identified piece of the first information of every one of the plurality of candidates.

4. The authentication system according to claim 1, wherein the at least one processor is configured to:

select, at random, a plurality of candidates that are some of the plurality of candidates selected in ascending order of the acquired count, and determine whether a piece of the first information that is the same as or similar to the user's piece of the first information is associated with the plurality of randomly selected candidates, and wherein the random selection and the determination are repeated until the one of the plurality of candidates that is unassociated with a piece of the first information that is the same as or similar to the user's piece of the first information is found.

5. The authentication system according to claim 1, wherein the at least one processor is configured to select the plurality of candidates by selecting a plurality of pieces of the second information in ascending order of the acquired count, until the total count reaches a predetermined count.

6. The authentication system according to claim 1, wherein the at least one processor is configured to assign a piece of the second information to the user based on a result of a search of a database, the database storing the first information and the second information for each of a plurality of other users, the search using one query including the plurality of candidates.

7. The authentication system according to claim 1, wherein the at least one processor is configured to:

receive an assignment request for requesting assignment of a new piece of the second information, from a user terminal of the user, each time a predetermined application recorded in the user terminal is activated, select the plurality of candidates when the assignment request is received, and assign a new piece of the second information to the user from the plurality of candidates.

8. The authentication system according to claim 7, wherein the at least one processor is configured to:

set an expiration date to a piece of the second information that is recorded in the user terminal; and transmit an activation request for requesting activation of the predetermined application to the user when the expiration date passes or expiration of the expiration date approaches.

9. The authentication system according to claim 1, wherein the piece of the second information that is assigned to the user is recorded in the user terminal of the user, and wherein the at least one processor is configured to execute the authentication based on the user's piece of the first information that is acquired with use of an authentication terminal configured to perform wireless communication to and from the user terminal, a piece of the second information that is transmitted from the user terminal to the authentication terminal through wireless communication, the user's piece of the first information that is registered in advance, and a piece of the second information that is associated with the user's registered piece of the first information.

10. The authentication system according to claim 9, wherein the user terminal is configured to transmit the piece of the second information to the authentication terminal by using an advertising packet in a predetermined wireless communication standard, and wherein the at least one processor is configured to execute the authentication based on the piece of the second information transmitted by using the advertising packet.

11. The authentication system according to claim 1, wherein the first information is biometric information, wherein the second information is identification information to be associated with the biometric information, and wherein the at least one processor is configured to execute the authentication based on a piece of the biometric information that is registered in advance and a piece of the identification information that is associated with the registered piece of the biometric information.

12. An authentication method, comprising:

executing authentication based on pieces of first information registered in advance and pieces of second information associated with the pieces of first information;

selecting, when a piece of the second information is to be assigned to a user, a plurality of candidates that are some of a plurality of registered pieces of the second information; and assigning, as the user's piece of the second information, one of the plurality of candidates that is unassociated with pieces of the first information that are the same as or similar to a user's piece of the first information;

acquiring, for each of the plurality of registered pieces of the second information, a count indicating how many pieces of the first information are associated with the registered piece of the second information, and selecting the plurality of candidates by selecting a plurality of pieces of the second information out of the plurality of registered pieces of the second information, in ascending order of the acquired count;

selecting, when the plurality of candidates selected in ascending order of the acquired count include no candidate that is unassociated with a piece of the first information that is the same as or similar to the user's piece of the first information, at least one next candidate by selecting at least one next piece of the second information in ascending order of the acquired count;

selecting the candidates at random until a total count indicating a sum of the acquired count acquired for every one of the plurality of registered pieces of the second information reaches a predetermined count.

13. A non-transitory computer-readable information storage medium for storing a program for causing a computer to function as:

select, in authentication executed based on pieces of first information registered in advance and pieces of second information associated with the pieces of first information, when a piece of the second information is to be assigned to a user, a plurality of candidates that are some of a plurality of registered pieces of the second information; and assign, as the user's piece of the second information, one of the plurality of candidates that is unassociated with pieces of the first information that are the same as or similar to a user's piece of the first information;

acquire, for each of the plurality of registered pieces of the second information, a count indicating how many pieces of the first information are associated with the registered piece of the second information, and select the plurality of candidates by selecting a plurality of pieces of the second information out of the plurality of registered pieces of the second information, in ascending order of the acquired count;

select, when the plurality of candidates selected in ascending order of the acquired count include no candidate that is unassociated with a piece of the first information that is the same as or similar to the user's piece of the first information, at least one next candidate by selecting at least one next piece of the second information in ascending order of the acquired count;

select the candidates at random until a total count indicating a sum of the acquired count acquired for every one of the plurality of registered pieces of the second information reaches a predetermined count.

\* \* \* \* \*